(12) United States Patent
Catten et al.

(10) Patent No.: US 8,188,887 B2
(45) Date of Patent: May 29, 2012

(54) SYSTEM AND METHOD FOR ALERTING DRIVERS TO ROAD CONDITIONS

(75) Inventors: J. Corey Catten, Holladay, UT (US); Scott McClellan, Heber, UT (US)

(73) Assignee: Inthinc Technology Solutions, Inc., West Valley City, UT (US)

( * ) Notice: Subject to any disclaimer, the term of this patent is extended or adjusted under 35 U.S.C. 154(b) by 551 days.

(21) Appl. No.: 12/379,154

(22) Filed: Feb. 13, 2009

(65) Prior Publication Data

US 2010/0207787 A1 Aug. 19, 2010

(51) Int. Cl.
G08G 1/09 (2006.01)
B60Q 1/00 (2006.01)

(52) U.S. Cl. ............ 340/905; 340/425.5; 340/936; 340/995.13; 340/995.27; 701/117; 701/119

(58) Field of Classification Search .......... 340/905
See application file for complete search history.

(56) References Cited

U.S. PATENT DOCUMENTS

| | | |
|---|---|---|
| 3,975,708 A | 8/1976 | Lusk |
| 4,419,654 A | 12/1983 | Funk |
| 4,458,535 A | 7/1984 | Juergens |
| 4,785,280 A | 11/1988 | Fubini |
| 4,926,417 A | 5/1990 | Futami |
| 4,939,652 A | 7/1990 | Steiner |
| 5,032,821 A | 7/1991 | Domanico |
| 5,305,214 A | 4/1994 | Komatsu |
| 5,309,139 A | 5/1994 | Austin |
| 5,325,082 A | 6/1994 | Rodriguez |
| 5,347,260 A | 9/1994 | Ginzel |
| 5,359,528 A | 10/1994 | Haendel |
| 5,365,114 A | 11/1994 | Tsurushima |
| 5,394,136 A | 2/1995 | Lammers |
| 5,400,018 A | 3/1995 | Scholl |
| 5,422,624 A | 6/1995 | Smith |
| 5,424,584 A | 6/1995 | Matsuda |
| 5,430,432 A | 7/1995 | Camhi |
| 5,436,612 A | 7/1995 | Aduddell |
| 5,436,837 A | 7/1995 | Gerstung |
| 5,446,659 A | 8/1995 | Yamawaki |
| 5,453,939 A | 9/1995 | Hoffman |
| 5,457,439 A | 10/1995 | Kuhn |
| 5,475,597 A | 12/1995 | Buck |
| 5,485,161 A | 1/1996 | Vaughn |
| 5,499,182 A | 3/1996 | Ousborne |
| 5,521,579 A | 5/1996 | Bernhard |
| 5,521,580 A | 5/1996 | Kaneko |
| 5,525,960 A | 6/1996 | McCall |
| 5,548,273 A | 8/1996 | Nicol |
| 5,581,464 A | 12/1996 | Woll |
| 5,586,130 A | 12/1996 | Doyle |
| 5,600,558 A | 2/1997 | Mearek |

(Continued)

FOREIGN PATENT DOCUMENTS

CA 2071931 12/1993

(Continued)

*Primary Examiner* — Donnie Crosland
(74) *Attorney, Agent, or Firm* — Baker Botts L.L.P.

(57) ABSTRACT

System and method for warning drivers of changing road conditions is disclosed. In one embodiment road condition information is obtained for at least a portion of a route. The road condition information is analyzed to identify one or more significant features on the portion of the route. The driver is alerted to the one or more significant features.

36 Claims, 7 Drawing Sheets

U.S. PATENT DOCUMENTS

| | | | |
|---|---|---|---|
| 5,612,875 A | 3/1997 | Haendel |
| 5,625,337 A | 4/1997 | Medawar |
| 5,642,284 A | 6/1997 | Parupalli |
| 5,648,755 A | 7/1997 | Yagihashi |
| 5,659,289 A | 8/1997 | Zonkoski |
| 5,689,067 A | 11/1997 | Klein |
| 5,708,417 A | 1/1998 | Tallman |
| 5,717,374 A | 2/1998 | Smith |
| 5,719,771 A | 2/1998 | Buck |
| 5,723,768 A | 3/1998 | Ammon |
| 5,740,548 A | 4/1998 | Hudgens |
| 5,742,915 A | 4/1998 | Stafford |
| 5,764,139 A | 6/1998 | Nojima |
| 5,767,767 A | 6/1998 | Lima |
| 5,795,997 A | 8/1998 | Gittins |
| 5,797,134 A | 8/1998 | McMillan |
| 5,801,618 A | 9/1998 | Jenkins |
| 5,801,948 A | 9/1998 | Wood |
| 5,825,283 A | 10/1998 | Camhi |
| 5,825,284 A | 10/1998 | Dunwoody |
| 5,844,475 A | 12/1998 | Horie |
| 5,847,271 A | 12/1998 | Poublon |
| 5,862,500 A | 1/1999 | Goodwin |
| 5,867,093 A | 2/1999 | Dodd |
| 5,877,678 A | 3/1999 | Donoho |
| 5,880,674 A | 3/1999 | Ufkes |
| 5,892,434 A | 4/1999 | Carlson |
| 5,907,277 A | 5/1999 | Tokunaga |
| 5,914,654 A | 6/1999 | Smith |
| 5,926,087 A | 7/1999 | Busch |
| 5,945,919 A | 8/1999 | Trask |
| 5,949,330 A | 9/1999 | Hoffman |
| 5,949,331 A | 9/1999 | Schofield |
| 5,954,781 A | 9/1999 | Slepian |
| 5,955,942 A | 9/1999 | Slifkin |
| 5,957,986 A | 9/1999 | Coverdill |
| 5,964,816 A | 10/1999 | Kincaid |
| 5,969,600 A | 10/1999 | Tanguay |
| 5,978,737 A | 11/1999 | Pawlowski |
| 5,982,278 A | 11/1999 | Cuvelier |
| 5,987,976 A | 11/1999 | Sarangapani |
| 6,002,327 A | 12/1999 | Boesch |
| 6,008,724 A | 12/1999 | Thompson |
| 6,018,293 A | 1/2000 | Smith |
| 6,028,508 A | 2/2000 | Mason |
| 6,028,510 A | 2/2000 | Tamam |
| 6,037,861 A | 3/2000 | Ying |
| 6,037,862 A | 3/2000 | Ying |
| 6,038,496 A | 3/2000 | Dobler |
| 6,044,315 A | 3/2000 | Honeck |
| 6,059,066 A | 5/2000 | Lary |
| 6,064,928 A | 5/2000 | Wilson |
| 6,064,970 A | 5/2000 | McMillan |
| 6,067,008 A | 5/2000 | Smith |
| 6,067,009 A | 5/2000 | Hozuka |
| 6,072,388 A | 6/2000 | Kyrtsos |
| 6,078,853 A | 6/2000 | Ebner |
| 6,081,188 A | 6/2000 | Kutlucinar |
| 6,094,149 A | 7/2000 | Wilson |
| 6,098,048 A | 8/2000 | Dashefsky |
| 6,100,792 A | 8/2000 | Ogino |
| 6,104,282 A | 8/2000 | Fragoso |
| 6,130,608 A | 10/2000 | McKeown |
| 6,133,827 A | 10/2000 | Alvey |
| 6,141,610 A | 10/2000 | Rothert |
| 6,147,598 A | 11/2000 | Murphy |
| 6,172,602 B1 | 1/2001 | Hasfjord |
| 6,184,784 B1 | 2/2001 | Shibuya |
| 6,185,501 B1 | 2/2001 | Smith |
| 6,198,995 B1 | 3/2001 | Settles |
| 6,204,756 B1 | 3/2001 | Senyk |
| 6,204,757 B1 | 3/2001 | Evans |
| 6,208,240 B1 | 3/2001 | Ledesma |
| 6,212,455 B1 | 4/2001 | Weaver |
| 6,216,066 B1 | 4/2001 | Goebel |
| 6,225,898 B1 | 5/2001 | Kamiya |
| 6,227,862 B1 | 5/2001 | Harkness |
| 6,229,438 B1 | 5/2001 | Kutlucinar |
| 6,232,873 B1 | 5/2001 | Dilz |
| 6,246,933 B1 | 6/2001 | Bague |
| 6,247,360 B1 | 6/2001 | Anderson |
| 6,249,219 B1 | 6/2001 | Perez |
| 6,253,129 B1 | 6/2001 | Jenkins |
| 6,255,892 B1 | 7/2001 | Gartner |
| 6,255,939 B1 | 7/2001 | Roth |
| 6,262,658 B1 | 7/2001 | O'Connor |
| 6,265,989 B1 | 7/2001 | Taylor |
| 6,266,588 B1 | 7/2001 | McClellan |
| 6,278,361 B1 | 8/2001 | Magiawala |
| 6,285,931 B1 | 9/2001 | Hattori |
| 6,289,332 B2 | 9/2001 | Menig |
| 6,294,988 B1 | 9/2001 | Shomura |
| 6,294,989 B1 | 9/2001 | Schofield |
| 6,295,492 B1 | 9/2001 | Lang |
| 6,301,533 B1 | 10/2001 | Markow |
| 6,308,120 B1 | 10/2001 | Good |
| 6,313,742 B1 | 11/2001 | Larson |
| 6,320,497 B1 | 11/2001 | Fukumoto |
| 6,333,686 B1 | 12/2001 | Waltzer |
| 6,337,653 B1 | 1/2002 | Bchler |
| 6,339,739 B1 | 1/2002 | Folke |
| 6,344,805 B1 | 2/2002 | Yasui |
| 6,351,211 B1 | 2/2002 | Bussard |
| 6,356,188 B1 | 3/2002 | Meyers |
| 6,356,822 B1 | 3/2002 | Diaz |
| 6,356,833 B2 | 3/2002 | Jeon |
| 6,359,554 B1 | 3/2002 | Skibinski |
| 6,362,730 B2 | 3/2002 | Razavi |
| 6,362,734 B1 | 3/2002 | McQuade |
| 6,366,199 B1 | 4/2002 | Osborn |
| 6,378,959 B2 | 4/2002 | Lesesky |
| 6,389,340 B1 | 5/2002 | Rayner |
| 6,393,348 B1 | 5/2002 | Ziegler |
| 6,404,329 B1 | 6/2002 | Hsu |
| 6,405,112 B1 | 6/2002 | Rayner |
| 6,424,268 B1 | 7/2002 | Isonaga |
| 6,427,687 B1 | 8/2002 | Kirk |
| 6,430,488 B1 | 8/2002 | Goldman |
| 6,433,681 B1 | 8/2002 | Foo |
| 6,441,732 B1 | 8/2002 | Laitsaari |
| 6,449,540 B1 | 9/2002 | Rayner |
| 6,459,367 B1 | 10/2002 | Green |
| 6,459,369 B1 | 10/2002 | Wang |
| 6,459,961 B1 | 10/2002 | Obradovich |
| 6,459,969 B1 | 10/2002 | Bates |
| 6,462,675 B1 * | 10/2002 | Humphrey et al. ........... 340/905 |
| 6,472,979 B2 | 10/2002 | Schofield |
| 6,480,106 B1 | 11/2002 | Crombez |
| 6,484,091 B2 | 11/2002 | Shibata |
| 6,493,650 B1 | 12/2002 | Rodgers |
| 6,512,969 B1 | 1/2003 | Wang |
| 6,515,596 B2 | 2/2003 | Awada |
| 6,519,512 B1 | 2/2003 | Haas |
| 6,525,672 B2 | 2/2003 | Chainer |
| 6,535,116 B1 | 3/2003 | Zhou |
| 6,542,074 B1 | 4/2003 | Tharman |
| 6,542,794 B2 | 4/2003 | Obradovich |
| 6,549,834 B2 | 4/2003 | McClellan |
| 6,556,905 B1 | 4/2003 | Mittelsteadt |
| 6,559,769 B2 | 5/2003 | Anthony |
| 6,564,126 B1 | 5/2003 | Lin |
| 6,567,000 B2 | 5/2003 | Slifkin |
| 6,571,168 B1 | 5/2003 | Murphy |
| 6,587,759 B2 | 7/2003 | Obradovich |
| 6,594,579 B1 | 7/2003 | Lowrey |
| 6,599,243 B2 | 7/2003 | Woltermann |
| 6,600,985 B2 | 7/2003 | Weaver |
| 6,604,033 B1 | 8/2003 | Banet |
| 6,611,740 B2 | 8/2003 | Lowrey |
| 6,611,755 B2 | 8/2003 | Coffee |
| 6,629,029 B1 | 9/2003 | Giles |
| 6,630,884 B1 | 10/2003 | Shanmugham |
| 6,636,790 B1 | 10/2003 | Lightner |
| 6,639,512 B1 | 10/2003 | Lee |
| 6,643,578 B2 | 11/2003 | Levine |
| 6,651,001 B2 | 11/2003 | Apsell |
| 6,657,540 B2 | 12/2003 | Knapp |

| Patent | Type | Date | Name |
|---|---|---|---|
| 6,665,613 | B2 | 12/2003 | Duvall |
| 6,674,362 | B2 | 1/2004 | Yoshioka |
| 6,675,085 | B2 | 1/2004 | Straub |
| 6,677,854 | B2 | 1/2004 | Dix |
| 6,678,612 | B1 | 1/2004 | Khawam |
| 6,696,932 | B2 | 2/2004 | Skibinski |
| 6,703,925 | B2 | 3/2004 | Steffel |
| 6,718,235 | B1 | 4/2004 | Borugian |
| 6,718,239 | B2 | 4/2004 | Rayner |
| 6,727,809 | B1 | 4/2004 | Smith |
| 6,728,605 | B2 | 4/2004 | Lash |
| 6,732,031 | B1 | 5/2004 | Lightner et al. |
| 6,732,032 | B1 | 5/2004 | Banet et al. |
| 6,737,962 | B2 | 5/2004 | Mayor |
| 6,741,169 | B2 | 5/2004 | Magiawala |
| 6,741,170 | B2 | 5/2004 | Alrabady |
| 6,745,153 | B2 | 6/2004 | White |
| 6,748,322 | B1 | 6/2004 | Fernandez |
| 6,750,761 | B1 | 6/2004 | Newman |
| 6,750,762 | B1 | 6/2004 | Porter |
| 6,756,916 | B2 | 6/2004 | Yanai |
| 6,759,952 | B2 | 7/2004 | Dunbridge |
| 6,775,602 | B2 | 8/2004 | Gordon |
| 6,784,793 | B2 | 8/2004 | Gagnon |
| 6,788,196 | B2 | 9/2004 | Ueda |
| 6,788,207 | B2 | 9/2004 | Wilkerson |
| 6,792,339 | B2 | 9/2004 | Basson |
| 6,798,354 | B2 | 9/2004 | Schuessler |
| 6,807,481 | B1 | 10/2004 | Gastelum |
| 6,813,549 | B2 | 11/2004 | Good |
| 6,819,236 | B2 | 11/2004 | Kawai |
| 6,832,141 | B2 | 12/2004 | Skeen |
| 6,845,314 | B2 | 1/2005 | Fosseen |
| 6,845,317 | B2 | 1/2005 | Craine |
| 6,847,872 | B2 | 1/2005 | Bodin |
| 6,847,873 | B1 | 1/2005 | Li |
| 6,859,039 | B2 | 2/2005 | Horie |
| 6,859,695 | B2 | 2/2005 | Klausner |
| 6,865,457 | B1 | 3/2005 | Mittelsteadt |
| 6,868,386 | B1 | 3/2005 | Henderson |
| 6,870,469 | B2 | 3/2005 | Ueda |
| 6,873,253 | B2 | 3/2005 | Veziris |
| 6,873,261 | B2 | 3/2005 | Anthony |
| 6,879,894 | B1 | 4/2005 | Lightner |
| 6,885,293 | B2 | 4/2005 | Okumura |
| 6,892,131 | B2 | 5/2005 | Coffee |
| 6,895,332 | B2 | 5/2005 | King |
| 6,914,523 | B2 | 7/2005 | Munch |
| 6,922,616 | B2 | 7/2005 | Obradovich |
| 6,922,622 | B2 | 7/2005 | Dulin |
| 6,925,425 | B2 | 8/2005 | Remboski |
| 6,928,348 | B1 | 8/2005 | Lightner |
| 6,937,162 | B2 | 8/2005 | Tokitsu |
| 6,950,013 | B2 | 9/2005 | Scaman |
| 6,954,140 | B2 | 10/2005 | Holler |
| 6,958,976 | B2 | 10/2005 | Kikkawa |
| 6,970,075 | B2 | 11/2005 | Cherouny |
| 6,972,669 | B2 | 12/2005 | Saito |
| 6,982,636 | B1 | 1/2006 | Bennie |
| 6,983,200 | B2 | 1/2006 | Bodin |
| 6,988,033 | B1 | 1/2006 | Lowrey |
| 6,989,739 | B2 | 1/2006 | Li |
| 7,002,454 | B1 | 2/2006 | Gustafson |
| 7,005,975 | B2 | 2/2006 | Lehner |
| 7,019,641 | B1 | 3/2006 | Lakshmanan |
| 7,023,332 | B2 | 4/2006 | Saito |
| 7,024,318 | B2 | 4/2006 | Fischer |
| 7,034,705 | B2 | 4/2006 | Yoshioka |
| 7,038,578 | B2 | 5/2006 | Will |
| 7,042,347 | B2 | 5/2006 | Cherouny |
| 7,047,114 | B1 | 5/2006 | Rogers |
| 7,049,941 | B2 | 5/2006 | Rivera-Cintron |
| 7,059,689 | B2 | 6/2006 | Lesesky |
| 7,069,126 | B2 | 6/2006 | Bernard |
| 7,069,134 | B2 | 6/2006 | Williams |
| 7,072,753 | B2 | 7/2006 | Eberle |
| 7,081,811 | B2 | 7/2006 | Johnston |
| 7,084,755 | B1 | 8/2006 | Nord |
| 7,088,225 | B2 | 8/2006 | Yoshioka |
| 7,089,116 | B2 | 8/2006 | Smith |
| 7,091,880 | B2 | 8/2006 | Sorensen |
| 7,098,812 | B2 | 8/2006 | Hirota |
| 7,099,750 | B2 | 8/2006 | Miyazawa |
| 7,099,774 | B2 | 8/2006 | King |
| 7,102,496 | B1 | 9/2006 | Ernst |
| 7,109,853 | B1 | 9/2006 | Mattson |
| 7,113,081 | B1 | 9/2006 | Reichow |
| 7,113,107 | B2 | 9/2006 | Taylor |
| 7,117,075 | B1 | 10/2006 | Larschan |
| 7,119,696 | B2 | 10/2006 | Borugian |
| 7,124,027 | B1 | 10/2006 | Ernst |
| 7,129,825 | B2 | 10/2006 | Weber |
| 7,132,934 | B2 | 11/2006 | Allison |
| 7,132,937 | B2 | 11/2006 | Lu |
| 7,132,938 | B2 | 11/2006 | Suzuki |
| 7,133,755 | B2 | 11/2006 | Salman |
| 7,135,983 | B2 | 11/2006 | Filippov |
| 7,138,916 | B2 | 11/2006 | Schwartz |
| 7,139,661 | B2 | 11/2006 | Holze |
| 7,145,442 | B1 | 12/2006 | Wai |
| 7,149,206 | B2 | 12/2006 | Pruzan |
| 7,161,473 | B2 | 1/2007 | Hoshal |
| 7,164,986 | B2 | 1/2007 | Humphries |
| 7,170,390 | B2 | 1/2007 | Quiñones |
| 7,170,400 | B2 | 1/2007 | Cowelchuk |
| 7,174,243 | B1 | 2/2007 | Lightner |
| 7,180,407 | B1 | 2/2007 | Guo |
| 7,180,409 | B2 | 2/2007 | Brey |
| 7,187,271 | B2 | 3/2007 | Nagata |
| 7,196,629 | B2 | 3/2007 | Ruoss |
| 7,216,035 | B2 | 5/2007 | Hörtner |
| 7,218,211 | B2 | 5/2007 | Ho |
| 7,218,924 | B2 | 5/2007 | McArdle |
| 7,222,009 | B2 | 5/2007 | Hijikata |
| 7,225,065 | B1 | 5/2007 | Hunt |
| 7,228,211 | B1 | 6/2007 | Lowrey |
| 7,233,235 | B2 | 6/2007 | Pavlish |
| 7,236,862 | B2 | 6/2007 | Kanno |
| 7,239,948 | B2 | 7/2007 | Nimmo |
| 7,256,686 | B2 | 8/2007 | Koutsky |
| 7,256,700 | B1 | 8/2007 | Ruocco |
| 7,256,702 | B2 | 8/2007 | Isaacs |
| 7,260,497 | B2 | 8/2007 | Watabe |
| RE39,845 | E | 9/2007 | Hasfjord |
| 7,269,530 | B1 | 9/2007 | Lin |
| 7,271,716 | B2 | 9/2007 | Nou |
| 7,273,172 | B2 | 9/2007 | Olsen |
| 7,280,046 | B2 | 10/2007 | Berg |
| 7,283,904 | B2 | 10/2007 | Benjamin |
| 7,286,917 | B2 | 10/2007 | Hawkins |
| 7,286,929 | B2 | 10/2007 | Staton |
| 7,289,024 | B2 | 10/2007 | Sumcad |
| 7,289,035 | B2 | 10/2007 | Nathan |
| 7,292,152 | B2 | 11/2007 | Torkkola |
| 7,292,159 | B2 | 11/2007 | Culpepper |
| 7,298,248 | B2 | 11/2007 | Finley |
| 7,298,249 | B2 | 11/2007 | Avery |
| 7,301,445 | B2 | 11/2007 | Moughler |
| 7,317,383 | B2 | 1/2008 | Ihara |
| 7,317,392 | B2 | 1/2008 | DuRocher |
| 7,317,927 | B2 | 1/2008 | Staton |
| 7,319,848 | B2 | 1/2008 | Obradovich |
| 7,321,294 | B2 | 1/2008 | Mizumaki |
| 7,321,825 | B2 | 1/2008 | Ranalli |
| 7,323,972 | B2 | 1/2008 | Nobusawa |
| 7,323,974 | B2 | 1/2008 | Schmid |
| 7,323,982 | B2 | 1/2008 | Staton |
| 7,327,239 | B2 | 2/2008 | Gallant |
| 7,327,258 | B2 | 2/2008 | Fast |
| 7,333,883 | B2 | 2/2008 | Geborek |
| 7,339,460 | B2 | 3/2008 | Lane |
| 7,349,782 | B2 | 3/2008 | Churchill |
| 7,352,081 | B2 | 4/2008 | Taurasi |
| 7,355,508 | B2 | 4/2008 | Mian |
| 7,365,639 | B2 | 4/2008 | Yuhara |
| 7,366,551 | B1 | 4/2008 | Hartley |
| 7,375,624 | B2 | 5/2008 | Hines |
| 7,376,499 | B2 | 5/2008 | Salman |

| | | | | | |
|---|---|---|---|---|---|
| 7,378,946 B2 | 5/2008 | Lahr | 2006/0154687 A1 | 7/2006 | McDowell |
| 7,378,949 B2 | 5/2008 | Chen | 2007/0229234 A1 | 10/2007 | Smith |
| 7,386,394 B2 | 6/2008 | Shulman | 2007/0293206 A1 | 12/2007 | Lund |
| 7,660,658 B2 * | 2/2010 | Sheynblat ............... 701/93 | 2008/0064413 A1 | 3/2008 | Breed |
| 7,739,036 B2 * | 6/2010 | Grimm et al. ............ 701/208 | 2008/0255888 A1 | 10/2008 | Berkobin |
| 7,859,392 B2 * | 12/2010 | McClellan et al. ....... 340/441 | | | |
| 2002/0126023 A1 * | 9/2002 | Awada .................. 340/905 | | | |

FOREIGN PATENT DOCUMENTS

| | | |
|---|---|---|
| JP | 2007235530 | 9/2007 |
| WO | WO2005109369 | 11/2005 |
| WO | WO2008109477 | 9/2008 |

| | | |
|---|---|---|
| 2004/0077339 A1 | 4/2004 | Martens |
| 2004/0142672 A1 | 7/2004 | Stankewitz |
| 2005/0064835 A1 | 3/2005 | Gusler |
| 2005/0065711 A1 * | 3/2005 | Dahlgren et al. ............ 701/117 |
| 2005/0107944 A1 * | 5/2005 | Hovestadt et al. ........... 701/200 |
| 2005/0143903 A1 * | 6/2005 | Park et al. .................. 701/117 |

* cited by examiner

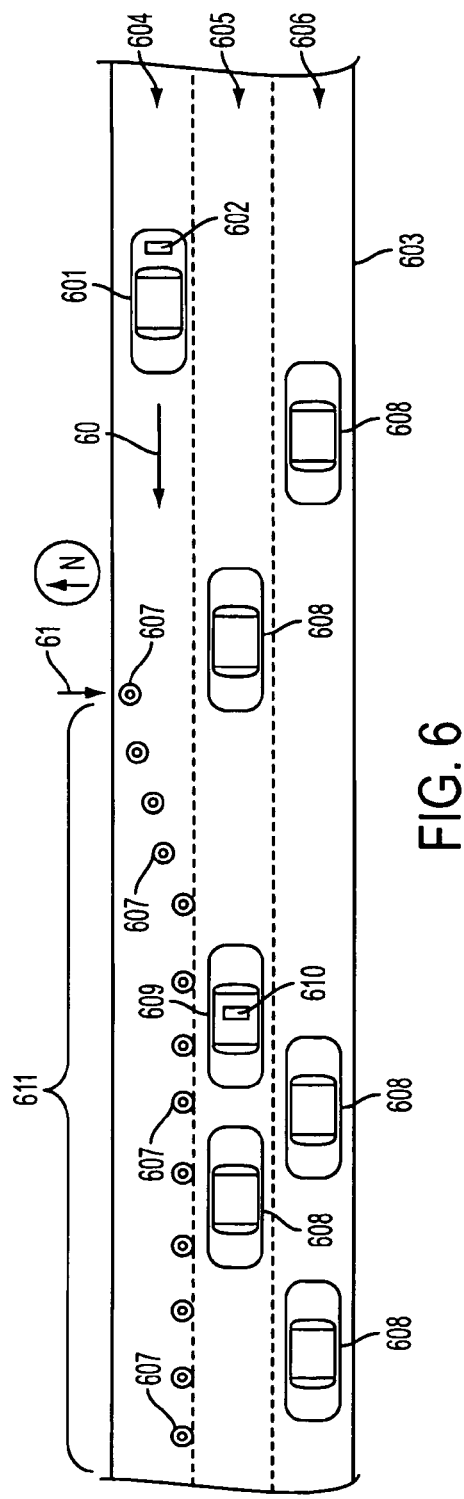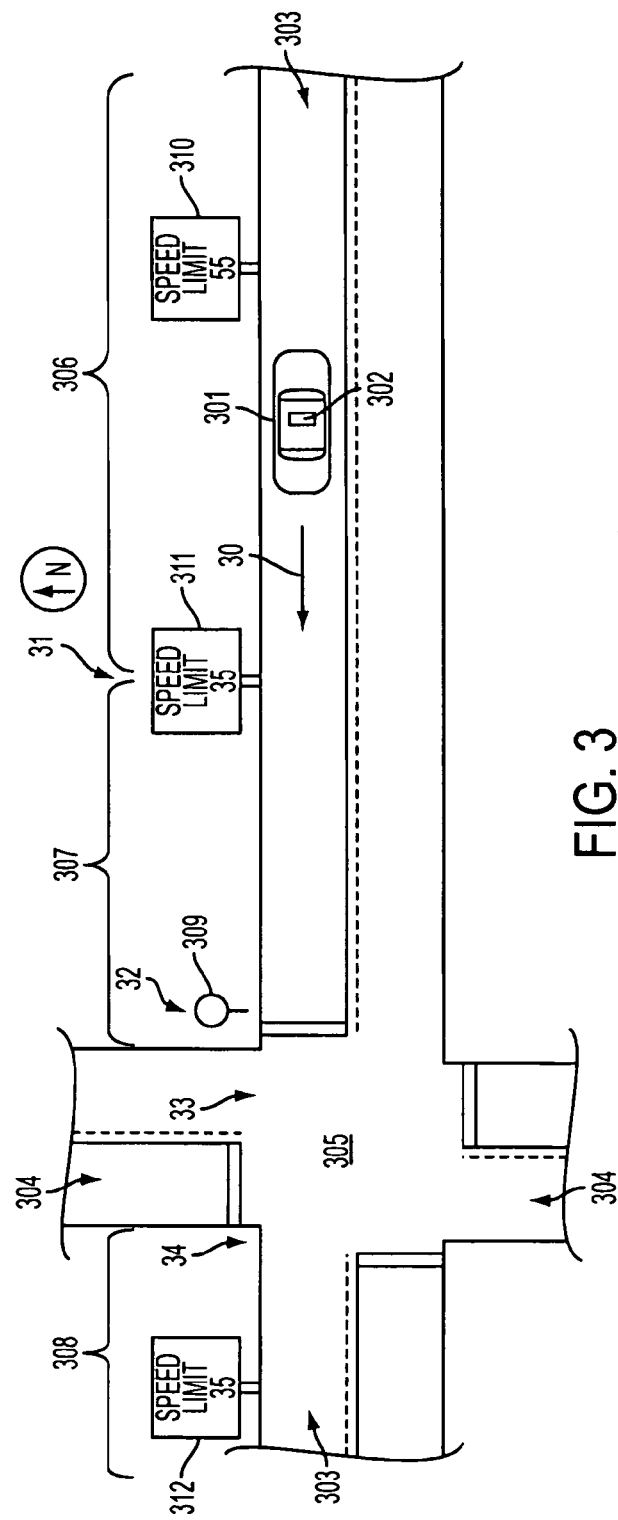
FIG. 6
FIG. 3

SYSTEM AND METHOD FOR ALERTING DRIVERS TO ROAD CONDITIONS

TECHNICAL FIELD

The present invention relates generally to a system and method for providing information and feedback to a driver and, more particularly, to a system and method for warning drivers of upcoming road conditions.

BACKGROUND

It is generally helpful to drivers if they are made aware of changes in driving conditions ahead of time. For example, in rural areas it is common for the speed limit on roads, such as state highways or county roads, in sparsely populated areas to be set at a maximum allowed speed, such as 55 to 70 miles per hour (MPH). When the road passes through a more populated area, such as a small town, the speed limit may drop suddenly to a slower speed, such as 25 to 45 MPH, for vehicles passing through the town before rising again to 55 to 70 MPH after the town. Other rapid changes in speed may occur when a driver approaches an intersection, a stop sign, a traffic light, a tollbooth, a school or hospital zone, a railroad crossing, or the like. Occasionally, signs, such as "speed zone ahead," may warn driver of the upcoming change in road conditions, but usually no other warning is available. If the driver is distracted, drowsy, or unfamiliar with the road he is traveling on, he may be surprised by the sudden change in road conditions. As a result, the driver may be unintentionally operating his vehicle at an unsafe or illegal speed. It would be safer if the driver was provided with additional warnings of upcoming changes in road conditions.

In addition to the permanent or static road conditions noted above, such as intersections, traffic signs or lights, or special speed zones, road conditions may also change due to temporary or dynamic changes, such as accidents, construction, heavy rush-hour traffic, special-events, weather, recurring events, or the like. No warning signs are available for many of these temporary or dynamic changes to road conditions since they are unscheduled and unexpected. As a result, drivers may come upon these road conditions without notice and with little time to reduce speed or otherwise adapt to the changed conditions. It would be safer if drivers also had some warning of these temporary and dynamic changes in road conditions. Furthermore, some dynamic events like scheduled sporting events, school opening/closing times, bus stops, etc. may be scheduled and, perhaps, expected, though it would still be advantageous and desirable to provide appropriate warnings to drivers.

Current vehicle navigation systems may provide warnings to drivers of upcoming route changes, such as upcoming turns, or provide directions to drivers to stay on route, such as instructions to stay or veer left or right where a selected route intersects multiple lanes or roads. Current vehicle navigation systems may also provide drivers with information regarding a current location, such as a street name. Other than these route-specific warnings and directions and current-location information, current vehicle navigation systems do not provide the driver with information regarding upcoming road conditions, road limitations or traffic conditions.

SUMMARY OF THE INVENTION

These and other problems are generally solved or circumvented, and technical advantages are generally achieved, by preferred embodiments of the present invention which warn drivers of static and/or dynamic changes in road conditions in sufficient time for the driver to adjust and adapt to the new road conditions.

In accordance with an embodiment of the present invention, a method for warning a driver of changing road conditions comprises obtaining road condition information for at least a portion of a selected route. The road condition information may be analyzed to identify one or more significant features on the portion of the selected route. The driver may then be alerted to the one or more significant features. The road condition information may be obtained from a memory resident in a vehicle being used by the driver or from a memory that is remote from the vehicle. The selected route may be calculated by a navigation application resident in the vehicle or by a navigation application that is remote from the vehicle. The alerting may further comprise displaying a warning to the driver, wherein the warning is selected based upon a current parameter of the vehicle, such as a current vehicle speed or a current vehicle location. The road condition information may include speed limit data, and the warning may be based upon the current vehicle speed. The selected route may be a route selected by a driver and/or a route selected automatically (e.g., the general vicinity in the anticipated direction of travel, the current road, or the like). Furthermore, the route may be "learned" or predicted based on prior collected information.

The driver alert may further include displaying a warning to the driver, wherein the warning is selected based upon the one or more significant features, such as a vehicle speed limitation, vehicle route restrictions, or temporary route restrictions. The alerting may include a warning displayed within a specified distance of the significant feature or a warning displayed within a specified time before the driver would reach the significant feature. The warnings may include, for example, audible, visual, and/or tactile feedback within the vehicle. The significant feature may include, for example, a change in a road condition parameter from a first value on a first section of the route to a second value on a second portion of the route. The significant feature may be change in posted speed limits on the route, or a change from a first speed limit assigned to a first section of the route to a second speed limit assigned to a section of the route.

In accordance with another embodiment of the invention, a method comprises retrieving information associated with a road on which a vehicle will be traveling at a future time. A warning may be broadcast to a driver of the vehicle. The warning may be triggered when a current vehicle operating parameter does not comply with a limitation associated with the road on which the vehicle will be traveling. The current vehicle operating parameter may be a current vehicle speed. The limitation may be, for example, a posted speed limit for the road, a stop sign, a road intersection, a railroad intersection, dramatic and influential environmental/weather changes requiring changes in driving parameters to maintain a safe trip, and the like on the road on which and/or near where the vehicle is expected to be traveling. The information associated with a road on which a vehicle will be traveling may be retrieved by requesting information associated with the road from a device that is remote from the vehicle.

In accordance with another embodiment of the invention, a method comprises retrieving information associated with a road on which the vehicle will be traveling at a future time. A warning may be broadcast to a driver of the vehicle. The warning may be triggered when a limitation associated with the road on which the vehicle will be traveling is different from a limitation associated with a road on which the vehicle is currently traveling. The limitation associated with the road on which the vehicle will be traveling may be a first posted speed limit, and the limitation associated with the road on which the vehicle is currently traveling is a second posted speed limit. The limitation associated with the road on which the vehicle will be traveling may be a first number of available lanes; and the limitation associated with a road on which the vehicle is currently traveling is a second number of available lanes. The information associated with a road on which a vehicle will be traveling may be retrieved by requesting information associated with the road from a device that is remote from the vehicle.

In accordance with another embodiment of the invention, a method for providing road-condition information to vehicles comprises storing road-condition information for a plurality of roads in a database. A request may be received from a vehicle-based application for information associated with a specific road or section of road. The vehicle-based application may be, for example, a vehicle monitoring system. The database may be searched for information associated with the specific road or section of road. Information associated with the specific road or section of road may then be sent to the vehicle-based application. The road-condition information may comprise road-condition information that has been received from a plurality of vehicle-based applications, such as a vehicle monitoring systems in a plurality of vehicles, for example. The road-condition information for the plurality of roads may be stored in a central database associated with a vehicle monitoring system network, or may be stored on-board the vehicle.

In accordance with other embodiments of the invention, a method for providing feedback to drivers comprises monitoring selected vehicle parameters while a vehicle is being driven. One or more vehicle operation violations may be detected by comparing the selected vehicle parameters to predetermined thresholds. The predetermined thresholds may be established based upon road-condition information for a road currently being used by the vehicle. A mentoring message may be provided or broadcast to the driver if the threshold is exceeded. If a vehicle operation violation has not been corrected within a preselected time period, then a violation report may be sent to a third party or to a central server. If the vehicle operation violation has not been corrected within a preselected time period, then a different mentoring message may be provided or broadcast to the driver. The selected vehicle parameters may be monitored by monitoring vehicle parameter data from an on-board vehicle diagnostic system. The road-condition information may include road-condition information received from a device that is remote from the vehicle.

BRIEF DESCRIPTION OF THE DRAWINGS

For a more complete understanding of the present invention, and the advantages thereof, reference is now made to the following descriptions taken in conjunction with the accompanying drawing, in which:

FIG. 3 illustrates changing road conditions that may trigger driver warnings in one embodiment of a vehicle monitoring system;

FIG. 6 illustrates temporary road conditions that may trigger driver warnings in one embodiment of a vehicle monitoring system;

DETAILED DESCRIPTION

The present invention provides many applicable inventive concepts that can be embodied in a wide variety of specific contexts. The specific embodiments discussed are merely illustrative of specific ways to make and use the invention, and do not limit the scope of the invention.

Figure 1:
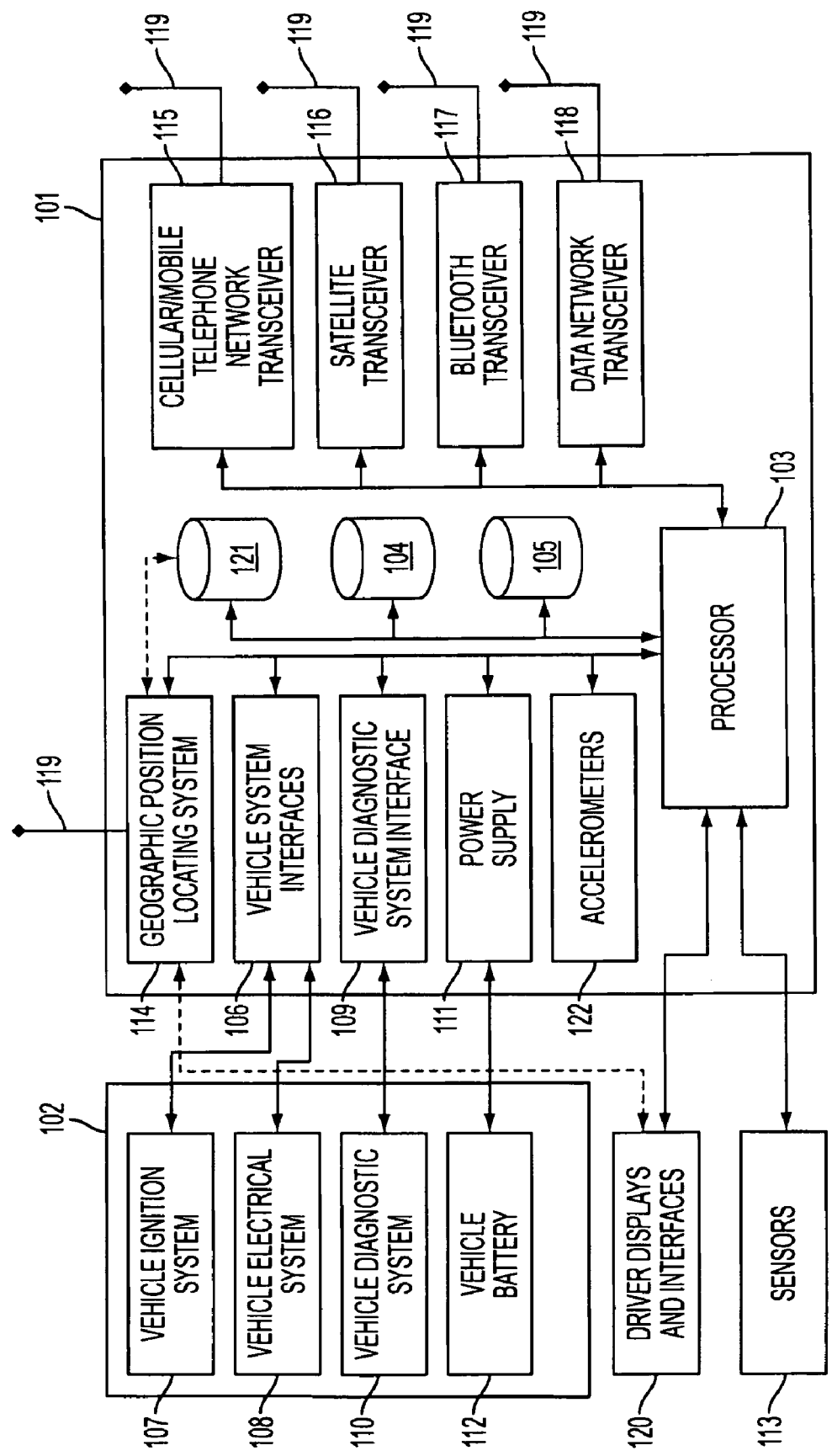
FIG. 1 is a high-level block diagram of a vehicle monitoring system according to one embodiment.

With reference to FIG. 1, there is shown vehicle monitoring system 101 that is coupled to one or more systems in vehicle 102. Processor 103 controls the operation of monitoring system 101. Processor 103 may be a general use processing device having software designed to control system 101. Alternatively, processor 103 may be a specially designed circuit or device, such as an application specific integrated circuit (ASIC), that is particularly designed for use in system 101. Processor 103 may use firmware or software, such as an operating system, for control and operation. Operating firmware, software and other data may be stored in random access memory (RAM) 104, read only memory (ROM) 105, electrically erasable programmable memory (EEPROM) devices, or other storage devices, such as magnetic media.

Monitoring system 101 includes one or more vehicle system interfaces 106 that allow system 101 to interact with systems in vehicle 102, such as vehicle ignition system 107 and vehicle electrical system 108. Signals exchanged between interface 106 and vehicle ignition system 107 may allow monitoring system 101 to determine the operating status of vehicle 102 and to command the ignition system to start or shutdown the engine of vehicle 102. Signals exchanged between interface 106 and vehicle electrical system 108 may allow monitoring system 101 to determine the status of other vehicle systems and to command other systems to operate. For example, vehicle electrical system 108 may provide control of the vehicle's horn, interior and/or exterior lights, entertainment system, navigation system, heating and/or air conditioning systems, alarm, or other vehicle system.

Vehicle diagnostic system interface 109 provides a connection between monitoring system 101 and vehicle diagnostic system 110. Vehicle diagnostic system 110 may be an on-board diagnostic (OBD) II system or a controller area network (CAN) system in vehicle 102 that is accessed via a port or data bus. The OBD/CAN system provides access to engine performance and status data, speedometer, odometer and tachometer data, and data from other vehicle systems. Power supply 111 provides power to monitoring system 101. Power supply 111 may be a self-contained battery, for example, or it may be coupled to another power source, such as vehicle battery 112. There may be a connection between power supply 111 and vehicle battery 112 or power supply 111 may receive vehicle power via the vehicle's OBD/CAN bus, for example.

In addition to vehicle sensors and diagnostic systems, such as OBD/CAN 110, monitoring system 101 may be coupled to other original equipment and aftermarket sensors 113 in vehicle 102. For example, monitoring system 101 may be coupled an RF (radio frequency) transmission sensor, which is configured to detect transmissions such as cellular voice and data signals that originate from or are received at vehicle 102, such as the sensors described in U.S. patent application Ser. No. 11/866,247, entitled "System and Method for Detecting Use of a Wireless Device in a Moving Vehicle," filed Oct. 2, 2007, the disclosure of which is hereby incorporated by reference herein in its entirety. Other sensors may include, for example, seatbelt use sensors, alcohol or ethanol vapor sensors, cameras, microphones, accelerometers, positioning sensors (e.g., GPS, LORAN, and the like), or crash detectors.

Monitoring system 101 further includes geographic position locating system 114, which provides location information for vehicle 102, such as a latitude/longitude, street address, or map coordinates, for example. In one embodiment, geographic position locating system 114 may be a global positioning system (GPS) that uses satellite signals to determine location. Other navigation or location-determining systems may also be used, such as inertial navigation systems that update a vehicle's location as it moves from a known position or terrestrial-based radio navigation systems, such as LORAN. In other embodiments, position locating system 114 may use transmissions or data from cellular or wireless network towers to determine a geographical location.

Monitoring system 101 may include one or more systems that provide communications with other devices and systems. For example, monitoring system 101 may include cellular or mobile telephone transmitter/receiver 115 that allows system 101 to communicate with other devices and to send or receive data via a cellular or mobile network. Satellite transmitter/receiver 116 allows system 101 to communicate with other devices and to send or receive data via satellite network communications. Bluetooth transmitter/receiver 117 allows system 101 to communicate with other devices that have Bluetooth capability. Data network transmitter/receiver 118 allows system 101 to communicate via networks, such as data communication networks using WiFi, IEEE 802.11, WiMAX, or other standards or protocols, for example. It will be understood that monitoring system 101 is not limited to the transmission method discussed herein, but may use any form of communication using any protocol and/or access method, such as any RF, Infrared, ultrasound, or other audible, optical, and/or otherwise electromagnetic communication system. Monitoring system 101 may further include one or more antennas 119 to support such communications. Antennas 119 may be internal to monitoring system 101, may be formed as an integral part of a housing for system 101, may be externally mounted on vehicle 102, or may be embodied in any antenna configuration now known or later developed.

Vehicle monitoring system 101 may also be used to provide information, such as vehicle status or location, to a driver and passengers in vehicle 102 using driver displays and interface 120. For example, processor 103 may be configured to identify alarm conditions, such as when vehicle 102 is operated outside of preselected conditions, and to provide feedback or alarms to the driver. Upon detection of an alarm condition, processor 103 may present a warning to the driver, such as a text messages, alarm horn, audible tone or message, or a visual warning via driver displays and interface 120. Driver displays and interface 120 may include, for example, speakers, horns, warning lights, keypads, graphics, text or image display screens, or touch-screen displays.

Driver displays and interface 120 may also provide position and routing data to the driver, such as street maps, maps of current or destination locations, suggested or actual routes, vehicle heading, vehicle speed, estimated trip duration, predicted destination arrival time, points of interest, and the like. Additionally, driver display could include the posted speed limit and/or the current versus posted speed differential. The position and routing information may be provided to driver display and interface 120 from processor 103 or from geographic position locating system 114, for example. Vehicle monitoring system 101 may further include street mapping database 121 for use with geographic position locating system 114 and/or processor 103. For example, street mapping database 121 may include street maps for multiple locations and street data for specific streets, such as posted speed limits, lane number and direction, road conditions, and traffic conditions. The data in street mapping database 121 may be stored in a compact disc (CD), digital video disc (DVD), random access memory, read only memory, electrically erasable programmable memory, or other magnetic media or electronic storage.

In other embodiments, street mapping database 121 may be stored in RAM 104 or ROM 105, or in geographic position locating system 114. In one embodiment, geographic position locating system 114 or processor 103 determine a current location of vehicle 102 and use data from street mapping database 121 to display a map of the current location to the driver via displays and interfaces 120, such as the current street on which vehicle 102 is driving. Additional information may be presented to the driver, such as a street name, driving direction, posted speed limit, expected traffic conditions, or the like. Geographic position locating system 114 may also be used to calculate, determine and/or display routing information to a selected destination.

In one embodiment, the street mapping information stored in database 121 may be updated, for example, but the driver or a third party. The driver may enter data, such as updated traffic or construction information, updated posted speed limits, street names, or street closures, via driver interfaces 120. Alternatively, or additionally, monitoring device 101 may receive updated street mapping data, such as via a wireless transmissions received by one or more of transceivers 115-118, from a third party, such as monitoring service operator, street mapping data provider, fleet manager, or other person or entity.

Vehicle monitoring system 101 may also include accelerometer module 122, which includes at least one accelerometer for measuring at least one of lateral (sideways), longitudinal (forward and aft) and vertical acceleration, for determining whether the driver is operating vehicle 102 in an unsafe or aggressive manner. For example, excessive lateral acceleration may be an indication that the driver is operating vehicle 102 at an excessive speed in a turn. Excessive lateral acceleration, defined herein as "hard turns," may be indicative of aggressive driving by the driver and may contribute to excessive wear on tires and steering components as well as potentially causing the load such as a trailer to shift and potentially overturn. Shifting loads can potentially cause damage to the load, the vehicle, the driver, and other persons and property. Additionally or alternatively, accelerometers 122 may include a self-contained and tamper-resistant event data recorder or crash data recorder (CDR) 205 similar to that which is shown and disclosed in U.S. Pat. Nos. 6,266,588 and 6,549,834 issued to McClellan et al., (the disclosures of which are hereby incorporated by reference herein in their entirety) and which is commercially known as "Witness" and commercially available from Independent Witness, Inc. of Salt Lake City, Utah. The CDR is adapted to continuously monitor vehicle motion and begin recording upon suprathreshold impacts whereupon it records the magnitude and direction of accelerations or G-forces experienced by the vehicle as well as recording an acceleration time-history of the impact event and velocity change between pre- and post-impact for a configurable duration following an impact. In one embodiment, the recordings are time-date stamped and are available to processor 103 for subsequent transmission to a supervisor or central monitoring facility if vehicle accelerations exceed an impulse threshold. Such accelerometers and CDRs are described in U.S. patent application Ser. No. 11/805,238, entitled "System and Method for Monitoring and Updating Speed-by-Street Data," filed May 22, 2007, the disclosure of which is hereby incorporated by reference herein in its entirety.

Figure 2:
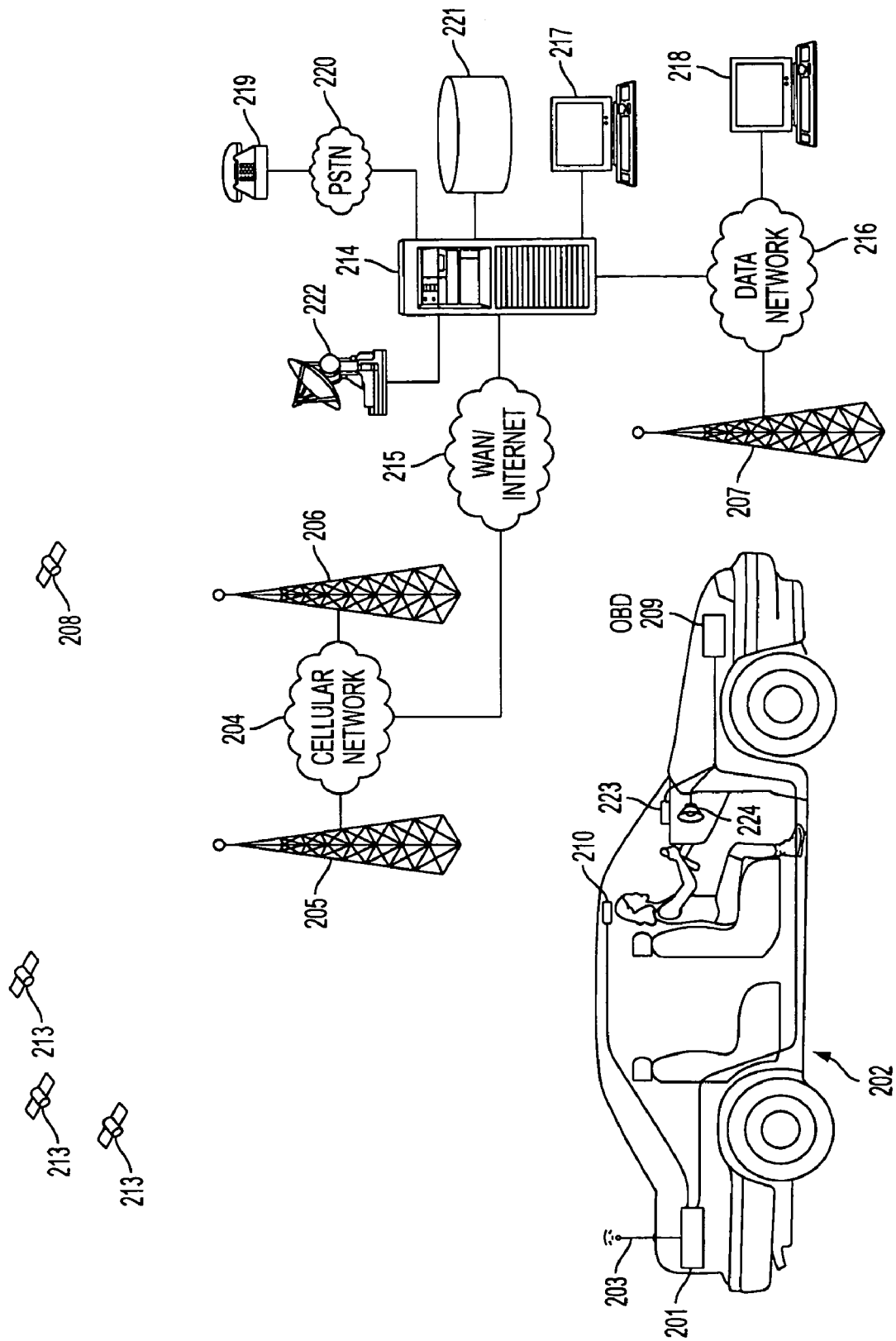
FIG. 2 is a high-level block diagram of a system for detecting wireless device usage in moving vehicles.

FIG. 2 illustrates monitoring system 201 installed or mounted in vehicle 202. Monitoring system 201 may include the elements of monitoring system 101 and may be coupled to systems in vehicle 202 as illustrated, for example, in FIG. 1. Monitoring system 201 may be mounted in any location within vehicle 202, such as in a trunk, under a seat, in a glovebox, or on a window or dashboard. Monitoring system 201 is coupled to one or more antennas 203, which may be used to communicate with one or more satellite or terrestrial communications networks. Monitoring system 201 may be capable of communicating with one or more networks or systems, such as cellular or mobile telephone network 204, having base stations or cell sites 205 and 206, wireless data network 207, such as a Bluetooth, WiFi, WiMAX or 802.11 network, or satellite 208. Monitoring system may also be in communication with or receive signals from satellites 213, which may be part of a geographical position locating system, such as a GPS system.

Monitoring system 201 is coupled to and in data communication with on board diagnostic system 209 in vehicle 202. Vehicle monitoring system 201 has access to certain vehicle operating parameters including, but not limited to, vehicle speed such as via the speedometer, engine speed or throttle position such as via the tachometer, and mileage such as via the odometer reading. Vehicle monitoring system 201 may also access and determine seat belt status and the condition of various other vehicle systems including anti-lock-braking (ABS), turn signal, headlight, cruise control activation and a multitude of various other diagnostic parameters such as engine temperature, brake wear, and the like. Monitoring system 201 may also be coupled to driver displays and interfaces, such as warning lights or touch-screen display 223 and/or speaker 224. Monitoring system 201 may also be coupled to one or more additional sensors 210, such as an RF sensor, camera, microphone, ethanol vapor sensor or the like.

Server 214 may be any processor-based system that is capable of communicating with external networks and processing data associated with wireless device usage and vehicle monitoring systems. Server 214 may be coupled to multiple networks, such as cellular network 204 or wireless data network 207, via networks 215 and 216, which couple server 214 to other communication networks, may be any public or private data network, such as an Internet, intranet, extranet, or wide or local area network (WAN/LAN). Server 214 may be coupled to satellite 208 via antenna 222. In one embodiment, users may communicate with server 214 via a local or remote personal computer (PC), laptop computer, or terminal, such as devices 215 or 216. Alternatively, server 214 may communicate with users via a wireless device (not shown) or a wireline connection, such as telephone 219, using, for example, voice signals, an interactive voice response (IVR), a voice response unit (VRU), or dual tone multi-frequency (DTMF) tones. Telephone 219 may be coupled to public switched telephone network (PSTN) 220.

Memory 221 may be used to store information, such as user account data, vehicle data, vehicle monitoring system information, or street mapping data. Server 214 may access data stored on memory 221 and may store data to memory 221. Users may access memory 221, for example, to enter, update, or edit account data, via terminals or computers 217 and 218. Memory 221 may be internal or external to server 214 and may be located near to or remote from server 214. Communication between monitoring system 201 and server 214 may be via cellular network 204, data network 207 and/or communication satellite network 208 depending upon availability of each network, the urgency of the message, and/or user configuration.

Vehicle monitoring system 201 may transmit reports to server 214, such as driving conditions, vehicle operation parameters, or violations of operating requirements or limitations. Server 214 may then take action to record, report and/or mentor this behavior. For example, a user may configure server 214 to take certain action upon detecting that vehicle 202 is speeding. Server 214 may command monitoring system 201 to broadcast warnings, such as audible messages or tones or visual lights or text, to the driver of vehicle 202. Additionally, server 214 may report the wireless device use to the driver's parent, supervisor, fleet manager or other authority. Such vehicle operation violations may trigger any number of actions preselected by the user and/or default actions in server 214.

The user may configure server 214 to send warning feedback to vehicle 202 upon detection of a potentially unsafe driving condition, such as speeding, driving the wrong way, or other conflicts with street mapping data. Such messages may warn the driver of the type of violation and/or direct the driver to discontinue the action or violation. Server 214 may take further action to warn or mentor the driver, notify a supervisor, or otherwise document the event as appropriate. Server 214 may also provide a report or notification to a supervisor or authority of the potentially unsafe driving conditions, such as by calling a fleet manager or parent via telephone 219 or by sending an email or text message to the supervisor.

Driver performance may be measured using vehicle monitoring equipment that is installed in a vehicle and collects information, such as the vehicle's speed, acceleration, and location. The system may capture data identifying where the vehicle is driven, when the vehicle is driven, and how the vehicle is driven (i.e. driver performance). One embodiment of a vehicle monitoring system is described in U.S. patent application Ser. No. 11/805,237, entitled "System and Method for Monitoring Vehicle Parameters and Driver Behavior," filed May 22, 2007, the disclosure of which is incorporated by reference herein in its entirety. The vehicle monitoring system may receive inputs from internal and external sources and sensors such as accelerometers, geographic position locating systems, global positioning systems (GPS), vehicle on-board diagnostic systems, seatbelt sensors, wireless device, or cell phone use detectors, alcohol vapor detectors, or trans-dermal ethanol detection. The vehicle monitoring system may be used to evaluate and grade driver behavior, as described in U.S. patent application Ser. No. 11/755,556, filed on May 30, 2007, entitled "System and Method for Evaluating Driver Behavior," the disclosure of which is hereby incorporated by reference herein in its entirety. The vehicle monitoring system may also be used to provide feedback and mentoring to the driver in order improve the driver's performance and driving behavior, such as described in U.S. patent application Ser. No. 11/768,056, filed on Jun. 25, 2007, entitled "System and Method for Monitoring and Improving Driver Behavior," the disclosure of which is hereby incorporated by reference herein in its entirety.

Embodiments of vehicle monitoring system 101 (FIG. 1) may evaluate a driver's performance based upon the operation of vehicle 102 compared to data in street mapping database 121. For example, the speed of vehicle 102 may be compared to posted speeds, road conditions, or traffic conditions stored in street mapping database 121, or the heading of vehicle 102 may be compared to traffic direction data stored in street mapping database 121. If vehicle monitoring system 101 detects a violation of an operating parameter, then the vehicle monitoring system may broadcast a warning or other feedback to the driver. In one embodiment, if a vehicle speed that is more than a posted speed stored in street mapping database 121, then a speeding warning is broadcast to the driver. In another embodiment, if a vehicle speed that is too fast for an expected road or traffic or weather condition stored in street mapping database 121, then an audible and/or visual warning or other mentoring feedback may be broadcast to the driver. In addition to such driver warnings, reports or notification may be sent to third parties, such as a supervisor, fleet manager, or parent.

Embodiments of the vehicle monitoring system may provide proactive warnings to the driver of upcoming changes in road and traffic conditions. For example, the vehicle monitoring system may "look ahead" along the vehicle's current route and notify the driver of upcoming changes in speed limits, road conditions, traffic conditions, or other parameters. The route analyzed by the vehicle monitoring system may be a user-selected route or a route calculated by a navigation system. Alternatively, if no specific route is selected, the vehicle monitoring system may assume that the driver will continue driving on the current road indefinitely. As noted above, the vehicle monitoring system may compare a current vehicle parameter, such as vehicle speed, to parameters for the currently used section of road, such a posted speed limit. If the vehicle speed exceeds the posted speed limit for the currently used section of road, then the vehicle monitoring system may provide warnings and feedback to the driver to correct a possible speeding violation. The vehicle monitoring system may also compare the vehicle's current speed to posted speed limits along the vehicle's route. If the vehicle is approaching a road with a posted speed limit that is lower than the vehicle's current speed, then the vehicle monitoring system may warn the driver of the upcoming speed limit. The vehicle monitoring system may also analyze the vehicle's route and warn the driver of upcoming changes in driving conditions, such as intersections, turns, merges, and the like.

FIG. 3 illustrates changing road conditions that may trigger driver warnings in one embodiment of a vehicle monitoring system. Vehicle monitoring system 302 is installed in vehicle 301, which is traveling westbound (in the direction of arrow 30) on road 303. Road 304 crosses road 303 at intersection 305. Road 303 has multiple sections 306 to 308. In section 306, the posted speed limit on road 303 is 55 MPH as noted on sign 310. Section 307 is contiguous with section 306 and connects road 303 to intersection 305 and road 304. Section 307 has a posted speed limit of 35 MPH as noted on sign 311. Stop sign 309 controls west-bound traffic on road 303 at intersection 305. Section 308 represents road 303 west of intersection 305. Section 308 may also have a posted speed limit of 35 MPH as noted on sign 312. The roads and features mapped in FIG. 3 are for purposes of illustration only and are not intended to limit the present invention. It will be understood that other features may be present in an actual intersection, such as additional traffic signs, stop signs, stop lights, and road markers, and may be used in conjunction with the present invention, but such features are not included in FIG. 3 in order to simplify the drawing.

Vehicle monitoring system 302 may obtain vehicle route information (i.e. the path mapped from one location to another) from any source. A geographic position locating application in vehicle monitoring system 302 may calculate a route for vehicle 301. Alternatively, a vehicle navigation system, such as a GPS system in vehicle 301 (not shown), may calculate a route and provide the route information to vehicle monitoring system 302. In other embodiments, a route may be calculated by a device external to vehicle 301, such as central server 214, and the route information provided to vehicle monitoring system 302 via a wireless connection, for example. It will be understood that the term "road" as used herein may refer to any throughway, including, without limitation, any interstate, state highway, main thoroughfare, minor thoroughfare, boulevard, street, road, alley, path, trail, or driveway that can be traversed by a motorized or unmotorized vehicle, animal or person. It will be further understood that the term "route" as used herein may include one or more of any such road or throughway.

In one embodiment, vehicle monitoring system 302 may be similar to vehicle monitoring system 101 (FIG. 1) or 201 (FIG. 2) as described herein. A geographic position locating application in vehicle monitoring system 302, such as a GPS navigation system or geographic position locating system 114, may track the location of vehicle 301. The geographic position locating application may also retrieve, analyze and monitor data associated with road 303 from a local street mapping database, such as database 121, or central database, such as database 214. The driver of vehicle 301 may have also selected a route to be monitored by the geographic position locating application and to be displayed, such as on display 120. If the driver has not selected a route, then the geographic position locating application may use a default route, such as a route that continues along current road 303. For purposes of the present example, it is assumed that the driver selected a route along road 303, or that vehicle monitoring system 302 predicted or estimated that vehicle 302 will continue along road 303.

The amount of route and road condition data retrieved by vehicle monitoring system 302 and the frequency with which the data is retrieved may vary depending upon any number of default or user-selected factors. A geographic position locating application in vehicle monitoring system 302 may retrieve road condition information at regular or irregular intervals or upon the occurrence of a particular event. For example, vehicle monitoring system 302 may retrieve road condition information for the whole route when the route is selected or updated. In other embodiments, vehicle monitoring system 302 may retrieve road condition information for just part of the route, such as for a selected number of miles or for the remaining route, at preset intervals of a selected number of seconds or minutes. Full or partial road condition information may also be retrieved at the beginning or end of each route segment. Road condition information may be locally stored, for example, in memory 121 of vehicle monitoring system 101 (FIG. 1). Alternatively, road condition information may be centrally stored, for example, in server 214 or database 221 (FIG. 2). Vehicle monitoring system 302 may retrieve and use locally stored or centrally stored road condition information and/or may use a combination of information from multiple sources. It will be understood that the terms "road condition" or "road condition information" as used herein is intended to broadly include any road or route information, such as, without limitation, intersections, sharp turns, merging lanes, on-ramps, off-ramps, dead-ends, railroad crossings, toll booths, gates, bridges, speed zones, school zones, hospital zones, passing zones, lane type, lane width, number of lanes, road surface, traffic signs, traffic lights, stop signs, yield signs, posted speed limits, accidents, breakdowns, construction zone, rush-hour traffic, special-event traffic, weather conditions, or any other road or traffic conditions.

In one embodiment, vehicle monitoring system 302 retrieves road condition information associated with the selected route and analyzes the information to identify upcoming changes in the condition of road 303. The road condition information may be associated with an entire route or just portions of the route, such as route segments that vehicle 301 is currently using and/or route segments that vehicle 301 should travel next or within some period. In the example illustrated in FIG. 3, vehicle monitoring system 302 may identify road condition information such as: a speed limit change from 55 MPH to 35 MPH at route point 31, stop sign 309 at route point 32, intersection 305 at route point 33, and a new section of road 303 beginning at route point 34. Vehicle monitoring system 302 may act as an early-warning system by generating driver alerts using this forward-looking road condition information for a selected route. For example, vehicle monitoring system 302 may display a list of some or all of road condition changes 31-34 to the driver. This information could provide an early warning to allow the driver to anticipate and react to changes in road and traffic conditions, thereby enhancing the overall safety of vehicle 301 and its operation.

Figure 4:
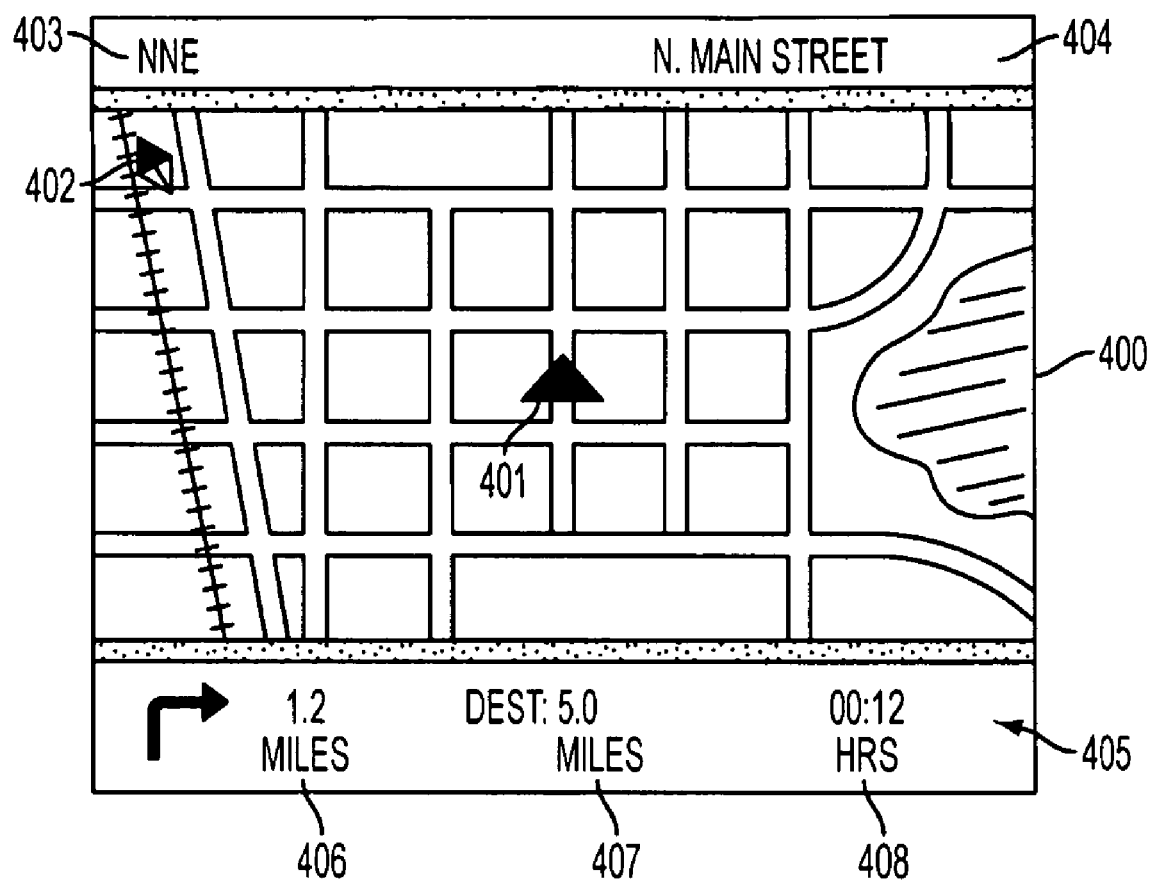
FIG. 4 illustrates one embodiment of a display that may be used to display vehicle location information and route information to a driver.

FIG. 4 illustrates one embodiment of a display that may be used, for example, to display vehicle location information and route information to a driver. Display 400 may be used, for example, in connection with a GPS or other geographic position locating system. In one embodiment, display 400 may be used as driver displays and interfaces 120 (FIG. 1). Vehicle location is shown by icon 401 located in the middle of display 400. Streets, railroad tracks, rivers, lakes, and other geographic features are shown on display 400. Heading information may be displayed, for example, using compass 402, which points to North, or using heading direction 403, which displays an approximate or exact vehicle heading. A current street name 404 may also be displayed to the driver. Other current location information, such as a city or county name, may also or additionally be displayed. Routing information 405, such as upcoming turn warning 406, distance to destination 407, and time to destination 408, may also be shown on display 400. As is well known, other location, route and destination information may be displayed, such as a turn list or maneuver list for a selected route, an elapsed route timer, alternate routing options, display zoom and pan controls, and current vehicle speed display. The displayed information may also be provided to the driver in an audible format, such as a spoken message that recites a current street, current city, upcoming turn or routing directions, or warnings.

Figure 5:
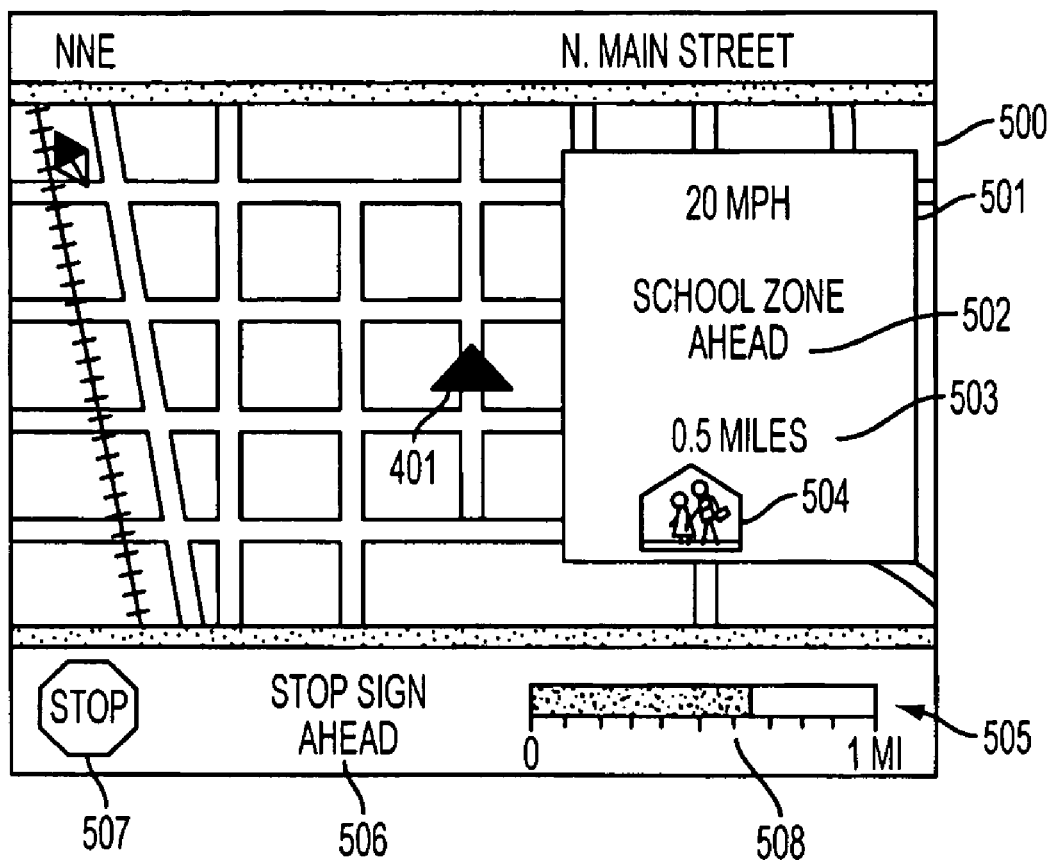
FIG. 5 illustrates one embodiment of a display for providing road condition information or warnings of changes in road conditions to the driver.

FIG. 5 illustrates one embodiment of a display 500 for providing road condition information or warnings of changes in road conditions to the driver. In one embodiment, pop-up or overlay warning 501 is displayed over the typical route and mapping information provided in display 500. Warning 501 identifies an upcoming change in road conditions, such as school zone warning 502 as illustrated, and provides a numerical countdown 503 of the distance to this road condition or feature. Warning, alert or information 501 may include an icon, such as icon 504, for example, to provide the driver with quick information regarding the type or category of upcoming road condition or feature. In another embodiment, warning, alert or information 505 may replace the default or "normal" information on display 400, such as replacing routing information 405 (FIG. 4). Warning 505 identifies the upcoming new or changed road condition, such as using text 506 or icon 507. Warning 505 may also provide a distance and/or countdown to the upcoming road condition using bar graph or sliding scale 508.

It will be understood that the size and placement of warnings 501 and 505 in FIG. 5 are merely examples and not intended to limit the positioning or content of warnings that may be provided using the invention. Although warning examples 501 and 505 are associated with an upcoming school zone and stop sign, respectively, a warning, alert or information may be presented for any road condition or change in road condition. Moreover, any stand traffic signal or other graphic or image may be used in place of icons 504 and 507 and may be selected depending upon the type of warning, alert or information presented. Other forms of static or dynamic distance information may also be used in place of distance indications 503 and 508. It will be understood that the warnings, alerts or information may include any combination of one or more of text 502, 506, icon 504, 507, distance indication 503, 508 and/or other parameters that may be useful to the driver.

Additionally, the vehicle monitoring system may present single or multiple warnings or alerts to the driver both in increasing frequency and/or pitch, and/or light intensity. The warning may also be in the form of a tactile alert. Referring again to FIG. 3, vehicle monitoring system 302 may provide a series of individual warnings to the driver so that the next road condition change to be encountered by vehicle 302 is displayed. For example, vehicle monitoring system 302 may first display a warning associated with the speed limit drop at route point 31. Once vehicle 302 is near or past point 31, then vehicle monitoring system 302 may display a warning associated with stop sign 309 at route point 32 or associated with intersection 305 at route point 33. At route point 34, vehicle monitoring system 302 may clear all warnings and alerts, for example, if there are no further road condition changes on segment 308 of road 303. Alternatively, vehicle monitoring system 302 may present a list of upcoming road condition changes to the driver. For example, a list of warnings associated with the speed limit drop at route point 31, stop sign 309 at route point 32, and intersection 305 at route point 33 may all be displayed to the driver. In some embodiments, vehicle monitoring system 302 may provide no warning associated with segment 308 since the 35 MPH speed limit 312 on section 308 is the same or greater than the speed limits of segment 307 and intersection 305 and, therefore, not likely to cause a speeding violation or sudden stop.

Embodiments of the invention provide drivers with warnings, alerts and/or information regarding road or traffic condition changes that may affect the way they are driving. The exemplary embodiment of FIG. 3 illustrates static or permanent road conditions, such as traffic signs and intersections, that are present all of the time and generally do not change. The exemplary embodiment of FIG. 6 illustrates a temporary or dynamic change in road conditions. Vehicles 601 and 609 having vehicle monitoring systems 602 and 610, respectively, are traveling generally westbound (in the direction of arrow 60) on road 603. Vehicle monitoring systems 602 and 610 may be similar to vehicle monitoring system 101 (FIG. 1) or 201 (FIG. 2) described herein. Vehicle monitoring systems 602 and 610 may be associated with a formal, informal or ad hoc vehicle monitoring network that allows data and information to be shared among users. For example, vehicle monitoring systems 602 and 610 may both be in communication with a central vehicle monitoring network server, such as server 214 (FIG. 2). Vehicle monitoring systems 602 and 610 may exchange vehicle and route information, road condition information, traffic information, driving conditions, vehicle operation parameters, or violations of operating requirements or limitations. Server 214 may provide, for example, full or partial routing information for use by the vehicle monitoring systems and/or a vehicle navigation system.

As illustrated in FIG. 6, road 603 has three westbound lanes 604-606. Typically, all three lanes 604-606 would be open for traffic; however, construction, traffic accidents, or other temporary problems may cause one or more lanes to be closed or blocked. Traffic cones 607, traffic barrels, barricades, construction equipment, or vehicles may block lane 604 and prevent vehicles 601, 608, 609 from using lane 604 beyond point 61. In the illustrated example, upon reaching construction zone 611, vehicle 609 is forced to slow down below the posted speed limit for road 603 due to traffic congestion. Vehicle monitoring system 610 may send updated road condition information to the central server. The updated road condition information may include, for example, actual traffic speeds and data regarding closed lane 604. The real-time data feed may also include optimal lanes during heavy traffic and suggest appropriate lane changes to maximize overall average speed. The updated road condition information may be sent using any communication format available to vehicle monitoring system 610, such as via messages carried on a cellular, satellite or data communications network. The format, protocol and parameters of such messages would be selectable by the designer and/or operator of the vehicle monitoring network depending upon the type and amount of content intended to be transferred and the available networks and bandwidth.

The updated road condition information may be sent by vehicle monitoring system 610 either automatically or at the driver's command. When vehicle monitoring system 610 detects that vehicle 609 is travelling below a posted speed limit for a certain amount of time, vehicle monitoring system 610 may automatically send a message including actual traffic speeds to the central server. In other embodiments, the driver may use a user interface to enter or select what information should be forwarded to the central server. The driver may provide information identifying lane 604 as closed, actual traffic speeds, the start and end points of the traffic congestion area, and/or a cause for the traffic congestion, such as labeling route section 611 as a construction zone.

The central server may store the updated road condition information. When the driver of vehicle 601 selects a route using road 603, vehicle monitoring system 602 may request routing and/or road condition information from the central server. The central server provides the requested information along with the updated road condition information, which allows the driver of vehicle 601 to receive the most up-to-date road condition information. Vehicle monitoring system 602 may provide the driver with warnings, alerts and/or other information regarding the temporary road condition of section 611 before vehicle 601 reaches point 61. For example, vehicle monitoring system 602 may warn the driver of closed lane 604 and that actual traffic speeds are below a posted speed limit in construction zone 611. Other dynamic events, such as traffic accidents, may also cause temporary changes to road conditions. These events may be transmitted to the central server for the vehicle monitoring network in real-time to provide accurate road condition information to other vehicles.

In addition to receiving updated road condition information from other vehicle monitoring systems, such as from vehicle monitoring system 610, the central server may receive updated information from other sources, such as from traffic-reporting websites operated by a governmental department of transportation or a news service. When a traffic-reporting website or server indicates that an accident has occurred or that a road is under construction, that information may be pushed to the central server or the central server may periodically poll such websites to search for updated traffic information. The updated information may be stored and provided to vehicles using a route that will pass the accident or construction site. Similarly, the central server may receive information from weather-reporting websites or servers. Data on server weather, such as an area of severe thunderstorms or a tornado watch, may be passed using the vehicle monitoring system to drivers in that area.

Some embodiments of the invention allow the driver or user to select the type of alerts, warnings or road condition information that is presented. The driver may be able to select which warnings or alerts should be displayed and which should be ignored. The driver is preferably able to choose to receive an alert for all, some or none of the potential warning events. For example, the driver may only want to be alerted to upcoming stop signs and to school zones. The vehicle monitoring system would display a warning for those events, but not for other events, such as railroad crossings, sharp turns, construction zones, etc. Alternatively, the driver may choose to set a threshold or trigger level for the potential warning events. For example, the driver may choose to be alerted to speed limit changes that are equal to or greater than a 20 MPH speed reduction. Accordingly, the vehicle monitoring system would alert the driver when a route takes the vehicle from a 65 MPH zone to a 45 MPH zone, but not for a drop from 65 MPH to 50 MPH.

In other embodiments, the driver may prioritize the order in which alerts are presented. For example, the driver may designate stop signs as first priority, merging lanes as a second priority, and railroad crossings as a third priority. When the vehicle is approaching an area having a stop sign at a railroad crossing, the vehicle monitoring system would alert the driver to the stop sign, but not the railroad crossing. However, on routes having just a railroad crossing, the vehicle monitoring system would notify the driver when the vehicle is approaching such crossings.

Preferably, the driver or user may select the time at which the selected warnings are presented. In one embodiment, the warnings are displayed within a certain distance from the changing road condition, such as beginning within one mile of a construction zone, or within half a mile of a stop sign. Alternatively, in other embodiments, the warnings are displayed based upon the projected time it would take the vehicle to arrive at the changed road condition. The speed of the vehicle would affect the location at such warnings are presented. For example, if the driver chose to have warnings displayed 30 seconds before the road condition change, then the warning would be displayed one-half mile early for vehicle traveling at 60 MPH, or one-quarter mile early for vehicles traveling at 30 MPH. The early warning times may be a function of a safety (increased safety equates to earlier notification and/or more adaptation time. The early warning times may also be a function of operational efficiency (fuel efficiency).

The vehicle monitoring system may further provide various levels of warnings, such as escalating warnings that get progressively more prominent as a vehicle approaches a road condition. The vehicle monitoring system may monitor the current operation of the vehicle and compare that information to current alerts or warnings. For example, the vehicle monitoring system may display a visual warning, such as message 501 (FIG. 5) on a navigation display, at one mile before a stop sign. If the vehicle has not slowed below a selected speed, the message (501) may begin flashing at one-half mile. If the vehicle has not slowed below a selected speed or if braking has not begun at one-eighth mile, then an audible warning may be played to the driver.

In other embodiments, the vehicle monitoring system may use the vehicle's speed to calculate an estimated minimum stopping distance. If the vehicle is within the minimum stopping distance of the road condition that may require the vehicle to stop, such as a stop sign, then the vehicle monitoring system may broadcast an audible and/or visual warning to the driver. For example, the vehicle monitoring system may determine that the vehicle is traveling at 60 MPH and that the minimum stopping distance is 240 feet. If the vehicle is still traveling at 60 MPH within 240 feet of an upcoming stop sign, the vehicle monitoring system may cause a visual warning to flash, broadcast an audible message, and/or sound a horn, buzzer, or other tactile alert to warn the driver.

As noted above, the vehicle monitoring system may be used to monitor, evaluate and improve driver behavior. In some embodiments, the parameters used to evaluate driver behavior may be modified based upon road conditions. Additionally, the driver may be evaluated based upon his reaction to changes in road conditions and his response to warnings of changing road conditions. The monitoring levels that are set in the vehicle monitoring system may be configured to be adjusted based upon road conditions. For example, a current road condition, such as a construction zone, may cause normal traffic speeds to drop below posted speed limits. The vehicle monitoring system may receive updated road condition information that identifies the expected or temporary speed limit for the construction zone. While in the construction zone, the vehicle monitoring system may use this temporary speed limit as a temporary threshold against which the driver's behavior is measured. The temporary threshold may also be used to trigger driver feedback when, for example, speed limits or other driving parameters are exceeded. Furthermore, alerts could be sent to police officers, or the like, where the alerts correspond to various moving violations in proximity to such officer.

Figure 7:
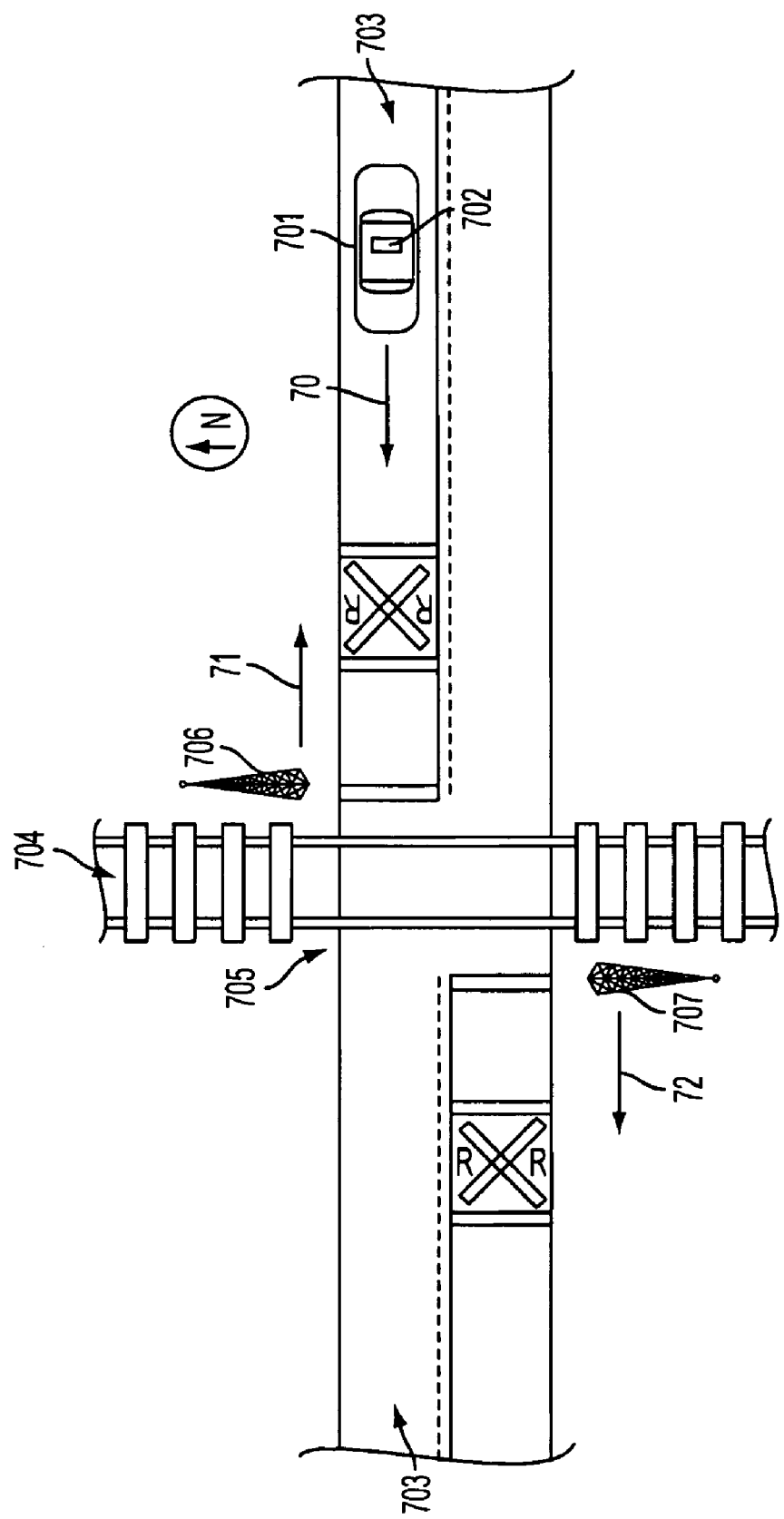
FIG. 7 illustrates other road conditions that may trigger driver warnings in an embodiment of a vehicle monitoring system.

FIG. 7 illustrates other road conditions that may trigger driver warnings in an embodiment of a vehicle monitoring system. Vehicle monitoring system 702 is installed in vehicle 701, which is traveling westbound (in the direction of arrow 70) on road 703. Railroad tracks 704 cross road 703 at intersection 705. Vehicle monitoring system 702 may be similar to vehicle monitoring system 101 (FIG. 1) or 201 (FIG. 2) described herein. As described above, vehicle monitoring system 702 may be configured to provide warnings to the driver as vehicle 701 approaches railroad crossing 705. Vehicle monitoring system 702 may use static or dynamic road condition information that is a locally stored or retrieved from a central location.

It can be anticipated that at times the road condition data may be incomplete, inaccurate or not available so that vehicle monitoring system 702 is not aware of railroad crossing 705. In such cases, the driver of vehicle 701 may come upon railroad crossing unexpected and/or be surprised by a train using railroad tracks 704. In some rural locations, railroad crossings have minimal signage and no railroad crossing gates, which may cause an unsafe situation for unfamiliar or distracted drivers. Vehicle monitoring system 702 may use an alternative source for road condition information in this case. Transmitter 706 at railroad intersection 705 may be used to broadcast specific road condition information, such as the presence or location of a railroad crossing. It will be understood that the railroad embodiment is just one example of the type of road condition that may be used with transmitter 705 and that other road conditions, such as construction zones, lane closures, stop signs or the like, may also be used with transmitter 706.

Transmitter 706 may broadcast in a circular pattern that can be received by vehicles within a certain range of intersection 705. Alternatively, transmitter 706 may transmit in a sector generally directed as shown by arrow 71 toward traffic approaching intersection 705 from the east on road 703. Transmitter 707 may transmit in a sector generally directed as shown by arrow 72 toward traffic approaching from the other direction. Transmitter 706 may broadcast information on any RF or infrared (IR) channel or frequency using any applicable protocol or format that is compatible with a receiver on vehicle monitoring system 702. For example, transmitter 706 may broadcast using a Bluetooth format that can be received by a Bluetooth transceiver (e.g. transceiver 117, FIG. 1) installed in vehicle monitoring system 702. In another embodiment, transmitter 706 may use radio-frequency identification (RFID) technology. Transmitter 706 may be an active, passive or semi-passive RFID tag or transponder. Vehicle monitoring system 702 may include or be coupled to an RFID reader that can receive information from RFID transmitter 706.

Transmitter 706 may broadcast continuously or may be prompted to transmit at any time using a RFID so that the road condition information is always available. When vehicle 701 approaches railroad crossing, vehicle monitoring system 702 receives road condition information when vehicle 701 moves within the broadcast range of transmitter 706. The road condition information may simply identify the presence of railroad crossing 705, or may include more specific information, such as a specific location information of the railroad crossing or latitude and longitude data. Vehicle monitoring system 702 may use the road condition and location information to determine if a warning or alert should be displayed to the driver. If the driver has configured vehicle monitoring system 702 to display railroad crossing warnings, then the appropriate visual and/or audio alerts will be displayed for the driver. Once vehicle 701 has moved past railroad crossing 705 and out of the range of transmitter 706, then vehicle monitoring system 702 may cancel or end the warning.

Additional options and features may be configured on transmitter 706 so that road condition information is only transmitted when train tracks 704 are in use or about to be used by a train. In such an embodiment, the road condition information would be transmitted under the same or similar conditions as those that cause railroad gates to be lowered or railroad crossing lights to be illuminated.

Figure 8:
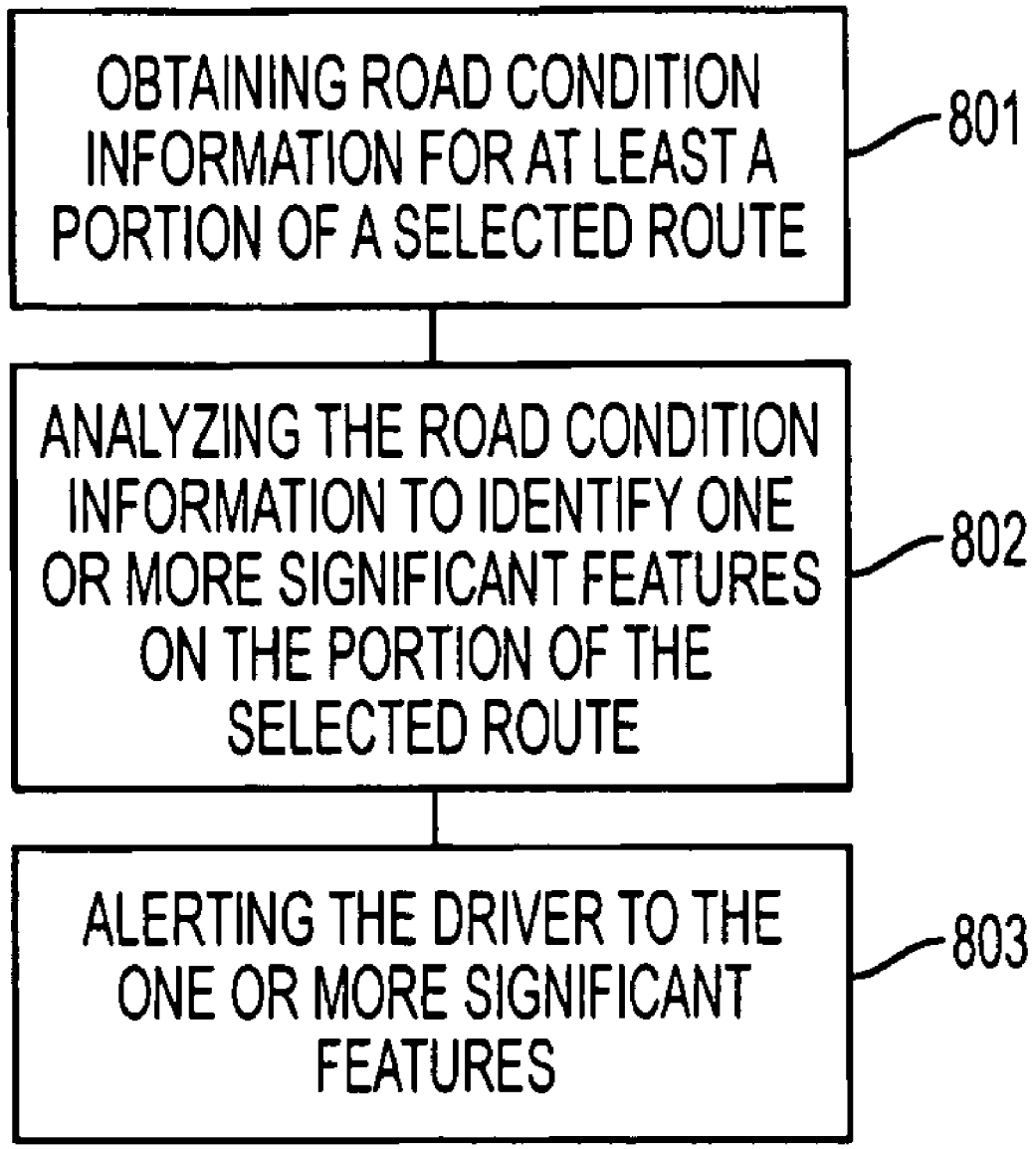
FIG. 8 illustrates a flowchart for an exemplary embodiment of a method for warning a driver of changing road conditions.

FIG. 8 illustrates a flowchart for an exemplary embodiment of a method for warning a driver of changing road conditions. The method illustrated in FIG. 8 may be implemented, for example, using vehicle monitoring system 101 or 201, but is not intended to be limited to such configurations. Moreover, it will be understood that the steps illustrated in FIG. 8 may be performed in the order indicated, or in any other order, or simultaneously, or in conjunction with other steps or methods.

In step 801, road condition information is obtained for at least a portion of a selected route. The road condition information may be obtained from a memory resident in a vehicle being used by the driver or from a memory that is remote from the vehicle, such as a memory associated with a vehicle monitoring network. The selected route may be entered by the driver, calculated by a navigation application resident the vehicle, calculated by a navigation application that is remote from the vehicle, such as in a vehicle monitoring network server, or a default route associated with the current road used by the vehicle.

In step 802, the road condition information is analyzed to identify one or more significant features on the portion of the selected route. The significant feature may include a change in a road condition parameter from a first value on a first section of the route to a second value on a second portion of the route. For example, the significant feature may be a change in posted speed limits on the route. The speed limit may change from a first speed limit assigned to a first section of the route to a second speed limit assigned to a section of the route.

In step 803, the driver is alerted to the one or more significant features. The alerting may include displaying a warning to the driver. The warning may be selected based upon a current parameter of a vehicle operated by the driver, such as a current vehicle speed or a current vehicle location. The road condition information may include speed limit data, and the warning may be based upon the current vehicle speed. The warning may also be selected based upon the one or more significant features. The significant features may include a vehicle speed limitation, such as a slow speed zone, speed limit, or stop sign, and/or vehicle route restrictions, such as a traffic signal, stop sign, intersection, turn, tollbooth, or railroad crossing. The significant features may also include temporary route restrictions, such as a lane closure, road closure, or construction zone. The warning may be displayed within a specified distance of the significant feature or within a specified time before the driver would reach the significant feature.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for warning a driver of changing road conditions, comprising:
    obtaining, at a vehicle monitoring device, current road condition information for at least a portion of a route;
    identifying a first feature and a second feature associated with the portion of the route, wherein the first feature comprises a change in a first road condition parameter and a second feature comprises a change in a second road condition parameter, wherein each of the first road condition parameter and second road condition parameter changes from a first respective value on a first respective section of the route to a second respective value on a second respective section of the route;
    determining that a vehicle is within a first distance threshold of the first feature, the first distance threshold associated with the first feature;
    alerting a driver of the vehicle to the first feature in response to determining that the vehicle is within the first distance threshold;
    determining that the vehicle is within a second distance threshold of the second feature, the second distance threshold associated with the second feature; and
    alerting the driver of the vehicle to the second feature in response to determining that the vehicle is within the second distance threshold.

2. The method of claim 1, wherein the current road condition information is obtained from a database residing in the vehicle.

3. The method of claim 1, wherein the current road condition information is obtained from a database that is remote from the vehicle being used by the driver.

4. The method of claim 1, wherein the route is calculated by a navigation application resident in the vehicle.

5. The method of claim 1, wherein the route is calculated by a navigation application that is remote from the vehicle.

6. The method of claim 1, wherein alerting further comprises displaying a warning to the driver; and wherein the warning is selected based upon a current parameter of the vehicle.

7. The method of claim 6, wherein the current parameter comprises at least one of a current vehicle speed parameter and a current vehicle location parameter.

8. The method of claim 6, wherein the current road condition information further comprises speed limit data; and wherein the warning is based upon the current vehicle speed parameter.

9. The method of claim 1, wherein alerting the driver to the first feature comprises displaying a warning to the driver; and wherein the warning is selected based upon the first feature.

10. The method of claim 9, wherein the first feature comprises a vehicle speed limitation.

11. The method of claim 9, wherein the first feature comprises vehicle route restrictions.

12. The method of claim 9, wherein the first feature comprises temporary route restrictions.

13. The method of claim 1, wherein alerting the driver to the first feature comprises broadcasting a warning to the driver.

14. The method of claim 1, wherein alerting the driver to the first feature comprises broadcasting a warning to the driver within a specified time before the vehicle reaches the first feature.

15. The method of claim 1, wherein the first road condition parameter is a speed limit on the route.

16. One or more computer-readable media having computer-usable instructions stored thereon for performing a method of warning a driver of changing road conditions, the method comprising:
    retrieving information associated with a road on which a vehicle will be traveling at a future time;
    determining, using a processor, whether a current vehicle operating parameter complies with a limitation associated with the road;
    determining that the vehicle is within a distance threshold of the limitation, the distance threshold associated with the limitation;
    broadcasting a warning to a driver of the vehicle in response to determining that the current vehicle operating parameter does not comply with the limitation associated with the road and the vehicle is within the distance threshold.

17. The media of claim 16, wherein the current vehicle operating parameter is a current vehicle speed; and wherein the limitation is a posted speed limit for the road.

18. The media of claim 16, wherein the current vehicle operating parameter is a current vehicle speed; and wherein the limitation is a stop sign on the road on which the vehicle will be traveling.

19. The media of claim 16, wherein the current vehicle operating parameter is a current vehicle speed; and wherein the limitation is at least one of a road intersection and a railroad intersection on the road on which the vehicle will be traveling.

20. The media of claim 16, wherein retrieving information associated with the road on which the vehicle will be traveling further comprises:
    requesting information associated with the road from a device that is remote from the vehicle.

21. One or more computer-readable media having computer-usable instructions stored thereon for performing a method of warning a driver of changing road conditions, the method comprising:
    retrieving information associated with a road on which a vehicle will be traveling at a future time;
    determining, using a processor, whether a first limitation associated with the road on which the vehicle will be traveling is different from a second limitation associated with the road on which the vehicle is currently traveling;
    determining that the vehicle is within a distance threshold of the first limitation, the distance threshold associated with the first limitation; and
    broadcasting a warning to a driver of the vehicle in response to determining that the first limitation associated with the road on which the vehicle will be traveling is different from the second limitation associated with the road on which the vehicle is currently traveling and the vehicle is within the distance threshold of the first limitation.

22. The media of claim 21, wherein the first limitation associated with the road on which the vehicle will be traveling is a first posted speed limit; and wherein the second limitation associated with the road on which the vehicle is currently traveling is a second posted speed limit.

23. The media of claim 21, wherein the first limitation associated with the road on which the vehicle will be traveling is a first number of available lanes; and wherein a second limitation associated with the road on which the vehicle is currently traveling is a second number of available lanes.

24. The media of claim 21, wherein retrieving information associated with the road on which the vehicle will be traveling further comprises:
    requesting information associated with the road from a device that is remote from the vehicle.

25. One or more computer-readable media having computer-usable instructions stored thereon for performing a method of providing road-condition information to vehicles, the method comprising:
    storing road-condition information for a plurality of roads in a database;
    receiving a request for information associated with a road;
    searching, using a processor, the database for information associated with the road; and
    sending information associated with the road, the information comprising:
        a first feature and a second feature associated with a portion of the road, wherein the first feature comprises a change in a first road condition parameter and a second feature comprises a change in a second road condition parameter, wherein each of the first road condition parameter and the second road condition parameter changes from a first respective value associated with a first respective section of the road to a second respective value associated with a second respective section of the road;
        a first distance threshold associated with the first feature; and
        a second distance threshold associated with the second feature.

26. The media of claim 25, wherein the request is received from a vehicle-based application.

27. The media of claim 25, wherein the road-condition information further comprises road-condition information that has been received from a plurality of vehicle-based applications.

28. The media of claim 25, wherein the road-condition information for a plurality of roads is stored in a central database associated with a vehicle monitoring system network.

29. A method for providing feedback to drivers, comprising:
    monitoring, at a vehicle monitoring device, selected vehicle parameters while a vehicle is being driven;
    detecting one or more vehicle operation violations by comparing the selected vehicle parameters to predetermined thresholds, wherein the predetermined thresholds are established based upon road-condition information for a road currently being used by the vehicle;
    determining whether at least one vehicle operation violation is based at least in part upon a feature associated with the road, wherein the feature comprises a change in a road condition from a first value associated with a first section of the road to a second value associated with a second section of the road;
    determining that the vehicle is within a distance threshold of the feature, the distance threshold associated with the feature;
    alerting a driver of the vehicle to the feature in response to determining that the vehicle is within the distance threshold; and
    providing a first mentoring message to the driver if one or more predetermined thresholds are exceeded.

30. The method of claim 29, further comprising:
    sending a violation report to a third party when at least one vehicle operation violation has not been corrected within a preselected time period.

31. The method of claim 29, further comprising:
    providing a second mentoring message to the driver when at least one vehicle operation violation has not been corrected within a preselected time period.

32. The method of claim 29, wherein monitoring selected vehicle parameters further comprises:
    monitoring vehicle parameter data from an on-board vehicle diagnostic system.

33. The method of claim 29, wherein the road-condition information comprises road-condition information received from a device that is remote from the vehicle.

34. A central monitoring server for providing road-condition information to vehicles, comprising:
    a receiver operable to receive a request for information associated with a road;
    a database operable to store road-condition information for a plurality of roads;
    a processor operable to search the database for information associated with the road; and a transmitter operable to send information associated with the road, the information comprising:
- a first feature and a second feature associated with a portion of the road, wherein the first feature comprises a change in a first road condition parameter and a second feature comprises a change in a second road condition parameter, wherein each of the first road condition parameter and the second road condition parameter changes from a first respective value associated with a first respective section of the road to a second respective value associated with a second respective section of the road;
- a first distance threshold associated with the first feature; and
- a second distance threshold associated with the second feature.

35. A vehicle monitoring unit for providing road-condition information to vehicles, comprising:
- a vehicle system interface operable to obtain vehicle parameters from one or more vehicle systems;
- a processor operable to:
  - detect one or more vehicle operation violations by comparing the vehicle parameters to predetermined thresholds, wherein the predetermined thresholds are established based upon road-condition information for a road currently being used by a particular vehicle;
  - determine whether at least one vehicle operation violation is based at least in part upon a feature on the road, wherein the feature comprises a change in a road condition from a first value associated with a first section of the road to a second value associated with a second section of the road; and
  - determine that the particular vehicle is within a distance threshold of the feature, the distance threshold associated with the feature; and
- an output interface operable to alert a driver of the particular vehicle to the feature in response to determining that the vehicle is within the first distance threshold.

36. The method of claim 35, wherein the output interface is further operable to provide a mentoring message to the driver if at least one predetermined threshold is exceeded.

* * * * *